United States Patent
Cohen et al.

(10) Patent No.: US 8,610,712 B2
(45) Date of Patent: Dec. 17, 2013

(54) OBJECT SELECTION IN STEREO IMAGE PAIRS

(75) Inventors: Scott D. Cohen, Sunnyvale, CA (US); Brian L. Price, San Jose, CA (US)

(73) Assignee: Adobe Systems Incorporated, San Jose, CA (US)

( * ) Notice: Subject to any disclaimer, the term of this patent is extended or adjusted under 35 U.S.C. 154(b) by 150 days.

(21) Appl. No.: 13/193,303

(22) Filed: Jul. 28, 2011

(65) Prior Publication Data

US 2013/0127824 A1    May 23, 2013

Related U.S. Application Data

(60) Provisional application No. 61/448,153, filed on Mar. 1, 2011.

(51) Int. Cl.
*G06T 15/00* (2011.01)
*G06K 9/00* (2006.01)
*G06F 3/048* (2013.01)

(52) U.S. Cl.
USPC .......................... 345/419; 382/154; 715/852

(58) Field of Classification Search
USPC .......................................................... 345/419
See application file for complete search history.

(56) References Cited

U.S. PATENT DOCUMENTS

| | | | | |
|---|---|---|---|---|
| 6,532,008 B1 * | 3/2003 | Guralnick | ...... | 345/419 |
| 6,714,672 B1 * | 3/2004 | Berestov et al. | ...... | 382/154 |
| 7,711,180 B2 * | 5/2010 | Ito et al. | ...... | 382/154 |
| 7,729,531 B2 * | 6/2010 | Winn et al. | ...... | 382/155 |
| 8,009,897 B2 * | 8/2011 | Xu et al. | ...... | 382/154 |
| 8,045,793 B2 * | 10/2011 | Ku et al. | ...... | 382/154 |
| 8,249,333 B2 * | 8/2012 | Agarwal et al. | ...... | 382/154 |

OTHER PUBLICATIONS

J.-H. Ahn, K. Kim, and H. Byun. Robust object segmentation using graph cut with object and background seed estimation. In ICPR, pp. 361-364, 2006.

X. Bai, J. Wang, D. Simons, and G. Sapiro. Video snapcut: robust video object cutout using localized classifiers. In SIGGRAPH, 2009. pp. 1-11.

D. Batra, A. Kowdle, D. Parikh, J. Luo, and T. Chen. icoseg: Interactive co-segmentation with intelligent scribble guidance. In CVPR, 2010. pp. 1-8.

Y. Boykov and M.-P. Jolly. Interactive graph cuts for optimal boundary and region segmentation of objects in N-D images. In ICCV, pp. 105-112, 2001. pp. 1-8.

(Continued)

*Primary Examiner* — Kee M Tung
*Assistant Examiner* — Richard M Russell
(74) *Attorney, Agent, or Firm* — Wolfe-SBMC

(57) ABSTRACT

A method is disclosed. Input data indicates a location within a region of a digital image of a stereo image pair. A boundary of the region and a corresponding boundary of a corresponding region of another digital image are defined based on the input data, content of the digital image, and content of the another digital image. The boundary and the corresponding boundary represent boundaries of a visual feature in the digital image and the other digital image. The defining further includes constructing a probability distribution for the digital image and another probability distribution for the other digital image. The probability distribution for the digital image represents a probability that each pixel of a set of pixels of the digital image is within the region. The other probability distribution represents a probability that each pixel of another set of pixels of the another digital image is within the corresponding region.

20 Claims, 17 Drawing Sheets

(56) References Cited

OTHER PUBLICATIONS

Y. Boykov and V. Kolmogorov. An experimental comparison of min-cut/max-flow algorithms for energy minimization in vision. PAMI, 26:1124-1137, Sep. 2004. pp. 1-14.

J. Cui, Q. Yang, F. Wen, Q. Wu, C. Zhang, L. V. Gool, and X. Tang. Transductive object cutout. In CVPR, 2008. pp. 1-8.

P. F. Felzenszwalb and D. P. Huttenlocher. Efficient belief propagation for early vision. IJCV, 70, Oct. 2006. pp. 1-14.

D. Hochbaum and V. Singh. An efficient algorithm for cosegmentation. In ICCV, 2009. pp. 1-8.

A. Joulin, F. Bach, and J. Ponce. Discriminative clustering for image co-segmentation. In CVPR, 2010. pp. 1-47.

S.-H. Kim, J.-H. Choi, H.-B. Kim, and J.-W. Jang. A new snake algorithm for object segmentation in stereo images. In IEEE Int'l Conference on Multimedia and Expo, 2004. pp. 1-4.

Y. Li, J. Sun, and H.-Y. Shum. Video object cut and paste. In SIGGRAPH, vol. 24, pp. 595-600, 2005. pp. 1-6.

B. Price, B. Morse, and S. Cohen. Geodesic graph cut for interactive image segmentation. In ICCV, 2010. pp. 1-8.

C. Rother, V. Kolmogorov, and A. Blake. Grabcut—interactive foreground extraction using iterated graph cuts. In SIGGRAPH, pp. 309-314, 2004. pp. 1-6.

C. Rother, T. Minka, A. Blake, and V. Kolmogorov. Cosegmentation of image pairs by histogram matching—incorporating a global constraint into mrfs. In CVPR, pp. 993-1000, 2006. pp. 1-14.

D. Scharstein and R. Szeliski. A taxonomy and evaluation of dense two-frame stereo correspondence algorithms. In IJCV, 2002. pp. 1-36.

C. Yang, R. Duraiswami, N. A. Gumerov, and L. Davis. Improved fast gauss transform and efficient kernel density estimation. In ICCV, pp. 464-471, 2003. pp. 1-8.

\* cited by examiner

|  |  | Error | | Results table 500 |
| --- | --- | --- | --- | --- |
| Algorithm | Truth | Boundary | Stroke | |
| Uniform | 1307 | 5995 | 11888 | |
| Delta | 684 | 4494 | 4793 | |
| PDF | 729 | 4458 | 5306 | |
| Consistent delta | 772 | 4361 | 3312 | |
| Consistent PDF | 694 | 4313 | 4861 | |
| Snapcut [2] | 886 | N/A | 5876 | |
| Livecut [13] | 2393 | 7134 | 4540 | |

FIG. 5

OBJECT SELECTION IN STEREO IMAGE PAIRS

CLAIM OF PRIORITY TO PROVISIONAL APPLICATION

This application claims benefit of priority of U.S. Provisional Application Ser. No. 61/448,153 entitled "Interactive Object Selection in Stereo Image Pairs" filed Mar. 1, 2011, the content of which is incorporated by reference herein in its entirety.

DISCLOSURE OF GOVERNMENT SUPPORT AND LICENSE RIGHTS

This invention was made with government support under Prime Award #: 1019343, Subaward #: CIF-B-149, CFDA: 47.070 awarded by The National Science Foundation. The government has certain rights in the invention. This material is based upon work supported by the National Science Foundation under Grant #1019343 to the Computing Research Association for the CIFellows Project.

BACKGROUND

Description of the Related Art

The recent popularity of three-dimensional (3D) display systems as a vehicle for the display of professionally-produced motion pictures and video games has resulted in a significant increase in demand for the ability to produce three-dimensional images for display in a wide variety of market segments. Specifically, demand exists for image sets and tools usable to create the perception of depth, which is capable of being generated through the use of multiple views of the same scene. Methods of interacting with stereo image pairs are useful for handling the increasing amount of stereoscopic 3D data now being produced.

Increasingly, that demand is serviced by cameras capable of natively producing stereoscopic image pairs through the use of multiple lenses spaced at a known distance. Likewise, stereoscopic images are sometimes captured from a single camera that is moved between image capture events.

In either case, the growing availability of multiple views of the same scene or objects has created demand for tools to enable users to consistently manipulate multiple images in order to create finished stereoscopic products.

SUMMARY

A method is disclosed. Input data indicates a location within a region of a digital image of a stereo image pair. A boundary of the region and a corresponding boundary of a corresponding region of another digital image are defined based on the input data, content of the digital image, and content of the other digital image. The boundary and the corresponding boundary represent boundaries of a visual feature in the digital image and the other digital image. The defining further includes constructing a probability distribution for the digital image and another probability distribution for the other digital image. The probability distribution for the digital image represents a probability that each pixel of a set of pixels of the digital image is within the region. The other probability distribution represents a probability that each pixel of another set of pixels of the other digital image is within the corresponding region.

BRIEF DESCRIPTION OF THE DRAWINGS

FIG. 5 depicts a table of numerical results of object selection according to some embodiments.

Figure 1:
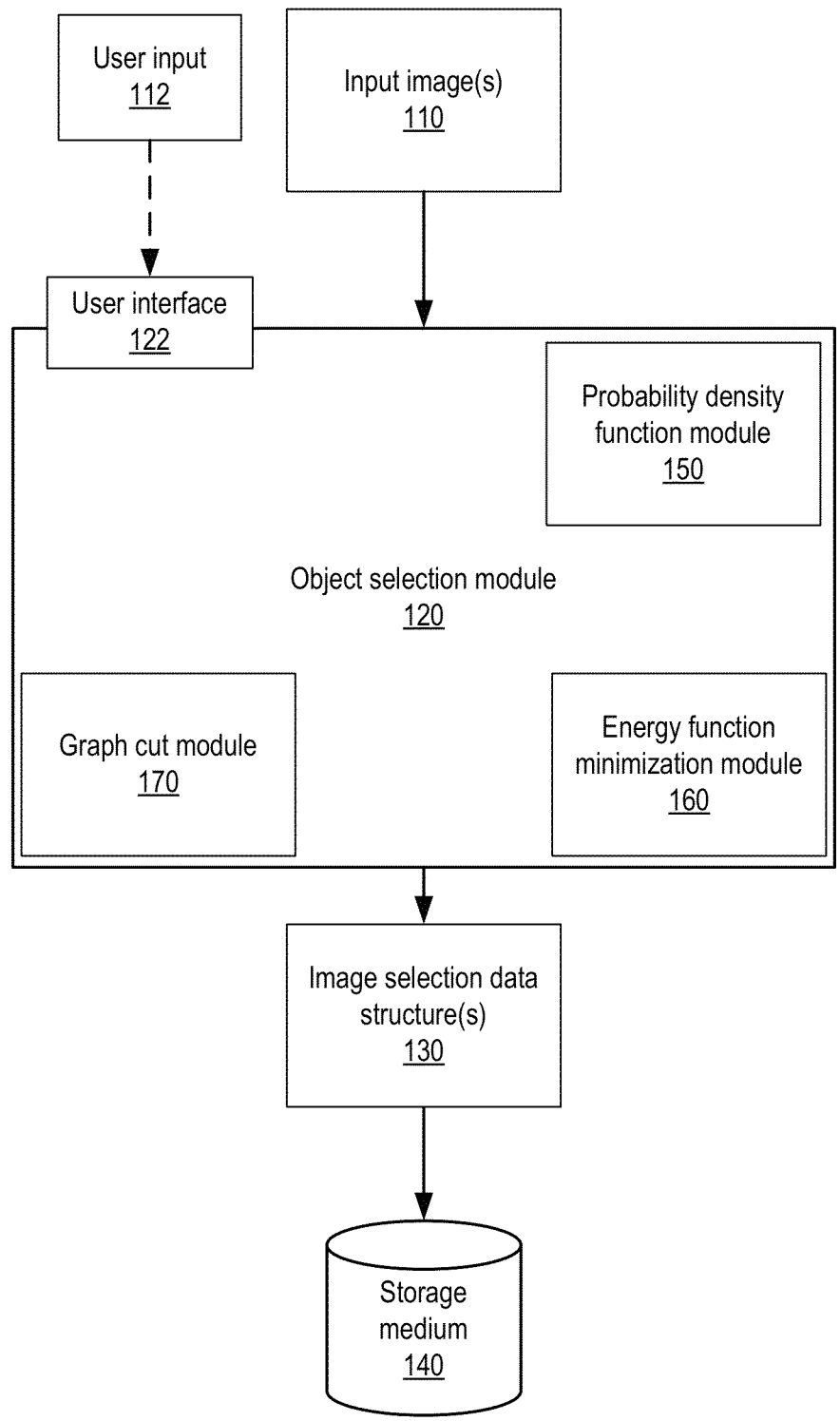
FIG. 1 illustrates a module that may implement object selection in stereo image pairs according to some embodiments.

While the invention is described herein by way of example for several embodiments and illustrative drawings, those skilled in the art will recognize that the invention is not limited to the embodiments or drawings described. It should be understood, that the drawings and detailed description thereto are not intended to limit the invention to the particular form disclosed, but on the contrary, the intention is to cover all modifications, equivalents and alternatives falling within the spirit and scope of the present invention. The headings used herein are for organizational purposes only and are not meant to be used to limit the scope of the description. As used throughout this application, the word "may" is used in a permissive sense (i.e., meaning having the potential to), rather than the mandatory sense (i.e., meaning must). Similarly, the words "include", "including", and "includes" mean including, but not limited to.

DETAILED DESCRIPTION OF EMBODIMENTS

In the following detailed description, numerous specific details are set forth to provide a thorough understanding of claimed subject matter. However, it will be understood by those skilled in the art that claimed subject matter may be practiced without these specific details. In other instances, methods, apparatuses or systems that would be known by one of ordinary skill have not been described in detail so as not to obscure claimed subject matter.

Some portions of the detailed description which follow are presented in terms of algorithms or symbolic representations of operations on binary digital signals stored within a memory of a specific apparatus or special purpose computing device or platform. In the context of this particular specification, the term specific apparatus or the like includes a general purpose computer once it is programmed to perform particular functions pursuant to instructions from program software. Algorithmic descriptions or symbolic representations are examples of techniques used by those of ordinary skill in the signal processing or related arts to convey the substance of their work to others skilled in the art. An algorithm is here, and is generally, considered to be a self-consistent sequence of operations or similar signal processing leading to a desired result. In this context, operations or processing involve physical manipulation of physical quantities. Typically, although not necessarily, such quantities may take the form of electrical or magnetic signals capable of being stored, transferred, combined, compared or otherwise manipulated. It has proven convenient at times, principally for reasons of common usage, to refer to such signals as bits, data, values, elements, symbols, characters, terms, numbers, numerals or the like. It should be understood, however, that all of these or similar terms are to be associated with appropriate physical quantities and are merely convenient labels. Unless specifically stated otherwise, as apparent from the following discussion, it is appreciated that throughout this specification discussions utilizing terms such as "processing," "computing," "calculating," "determining" or the like refer to actions or processes of a specific apparatus, such as a special purpose computer or a similar special purpose electronic computing device. In the context of this specification, therefore, a special purpose computer or a similar special purpose electronic computing device is capable of manipulating or transforming signals, typically represented as physical electronic or magnetic quantities within memories, registers, or other information storage devices, transmission devices, or display devices of the special purpose computer or similar special purpose electronic computing device.

Various embodiments of methods and apparatus for interactive object selection in stereo image pairs are disclosed. Some embodiments may include a means for performing interactive object selection in stereo image pairs. For example, a interactive object selection module may receive input identifying a portion of a digital image on which interactive object selection is to be performed, and may perform interactive object selection based on the input, as described herein. The interactive object selection module may in some embodiments be implemented by a non-transitory, computer-readable storage medium and one or more processors (e.g., CPUs and/or GPUs) of a computing apparatus. The computer-readable storage medium may store program instructions executable by the one or more processors to cause the computing apparatus to perform receiving input identifying a portion of a digital image on which a interactive object selection should be performed. Other embodiments of the interactive object selection module may be at least partially implemented by hardware circuitry and/or firmware stored, for example, in a non-volatile memory.

Introduction to Stereo Image Selection

Embodiments focus on the task of consistently selecting an object, also referred to as a region, in a set of multiple views of the same scene. In particular, embodiments support consistent selection of an object or region in both images of a stereoscopic image pair. Consistent selection of an object or region in both images of a stereoscopic image pair is a useful operation for support of image editing on specific regions of the two images.

Some embodiments present an interactive tool for object selection in stereo image pairs, which is designed to minimize the amount of user interaction required to select an object consistently in both images. Such embodiments seek to produce accurate results in the image in which the user is working and also select the corresponding pixels in the other image. By taking advantage of the epipolar geometry of the images, as described below, embodiments calculate the selection in both frames together. Embodiments seek to alleviate the challenges that persist, even in the presence of correspondence data, with respect to object selection in a stereo image pair. Embodiments provide refinements to compensate for selection difficulties. As an example of such selection difficulties, occluded regions and areas at the side of an image frequently have no corresponding regions in the other image. Likewise, because a perfect stereo matching algorithm has yet to be invented, errors exist in the disparities between locations of features in an image pair. Because of difficulties such as these, some embodiments combine stereo depth cues with other cues to allow for stereo selection.

Some embodiments present an interactive selection tool for simultaneously computing the segmentation in both images. Segmentation means the definition of a boundary between regions of an image, or, in this case, the boundaries between regions in two images. In such embodiments, a selection is generated interactively by allowing a user to draw strokes in the most convenient image to indicate the object or the background. Segmentation is then computed. In some embodiments, a graph cut algorithm is then used to compute the segmentation. Other embodiments allow segmentation algorithms other than graph cut to be employed without departing from the scope and intent of the present disclosure. Some embodiments incorporate probability density functions (PDFs) that allow stereo matching correspondences to be used in optimizing the selection. Various embodiments accommodate use of several possible distributions, such as uniform distributions and distributions based on disparities or probability distributions produced by stereo matching algorithms. Some embodiments apply consistency constraints to improve the performance. Such embodiments provide flexibility by allowing use of different distributions, and this flexibility allows embodiments to take advantage of future advances in stereo matching. Description of the evaluation of example embodiments is provided in the present disclosure. To evaluate example embodiments, example embodiments are tested against a dataset of stereo images, inputs, and ground truth selections as described below.

Some embodiments employ a graph cut-based algorithm and a user interface for interactively and simultaneously selecting a shared visual feature or other object. Graph cut-based algorithms model the selection problem as a graph such that the minimum cut on the graph also minimizes an energy function constructed from graph parameters. Selection is performed in a stereoscopic 3D pair of images as the user provides input data in the form of foreground and background stokes to indicate image areas to include in and exclude from the selection region. Embodiments use correspondence information output from a stereo matching algorithm in a selection objective function in order to improve a user's ability to select the same object in a stereo pair of images by providing input in either of the images. The "cross image" terms that allow information output from a stereo matching algorithm to be used in the selection objective function encourage two pixels that are likely correspondences to agree in the computed selection. Thus, embodiments facilitate selection such that pixels in the two input images that are projections of the same 3D real world point onto the two imaging planes are selected as being either both pixels in the selection or both pixels not in the selection.

As discussed below with respect to FIG. 2, some embodiments employ a user interface (UI) that shows both input images side-by-side and updates the selection in both images as the user provides input data by brushing with foreground or background brushes. The user may add to or remove from the selection by stroking in either image, switching back-and-forth between the images at any time during the selection process. The ability to brush in either image and switch between images for input facilitates selection in situations in which it is easier to provide input with respect to a particular feature in one image than in the other. For example, to remove a small area from a selection, it is easier to perform strokes indicating the removal with the background brush in the image in which the unwanted area is larger, because a larger brush may be used with a less precise stroke. The ability to switch images as needed further increases efficiency because, having made a correction in one image, embodiments allow the user to continue giving input in the same image, which minimizes pointing device (e.g., mouse) movement. Another example of the advantages of the ability of some embodiments to accept input in either image arises when an area to be selected or removed from the selection is visible in only one image and brushing that area must take place in the image with visibility.

Some embodiments use in the objective function dense correspondence information over the entire images of the image pair. Such embodiments take advantage of the nature of stereo image input by exploiting the fact that stereo input images are images of a single scene for which dense correspondences exist in the underlying data. Such embodiments use the fact that correspondences are found along lines in stereo pairs to limit the search for correspondences, and accompanying commitment of processor resources. Some embodiments perform rectification or use a pair of stereo images that has been "rectified," so that correspondences occur only along horizontal scanlines with the same y value. Such embodiments allow for less mathematically complex and more computationally efficient implementation that links potential correspondences, allowing for much smaller graphs on the basis of knowledge that a correspondence search can be limited to a 1D search instead of a 2D search. In such embodiments, only pixels on the same scanline within some selected maximum disparity need be linked, rather than all pixels within a given distance. Such embodiments analyze a much smaller graph, which allows for computational results that are faster with respect to the minimum graph cut selection than alternative approaches.

Some embodiments employ a selection method fast enough to update the selection "live" in both images as the user is brushing, as opposed to waiting for the user to finish a particular stroke, allowing interactive and live selection. In such embodiments with immediate feedback, the user is effectively provided with realtime hints as to how to move the mouse to get to the desired selection, instead of waiting for the selection to update on mouse up and then guessing where to put the next stroke to have the desired effect.

In addition to the interactive method provided by some embodiments, other embodiments operate in a batch mode in which all strokes are presented to the algorithm at once and then the selection is computed. Still other embodiments operate interactively with slower updates. Depth is used by some embodiments as a cue for selection. Stereo image input allows for this cue to be easily derived by embodiments and used after performing stereo matching. Use of depth provides helpful results in cases in which depth completely separates the object to be selected from the background. An example of such a case is an image pair in which a person's body and head are presented in front of a background that is far away from the person. Use of depth also provides helpful results in cases in which depth almost completely separates the object. An example of such a case is an image pair in which a vase sits on a table with a distant background. Except for the area of attachment at which the vase touches the table and has the same depth as the table, the depths of the vase are different from all the other objects in the scene. The depth cue can be used in combination with other cues such as color to define the selection criteria. When the input pair of images has been rectified, the depth for a pixel is proportional to its inverse disparity, where disparity is the distance between the two corresponding pixels, and some embodiments use either depth or disparity to build a depth cue for use by the selection algorithm.

Some embodiments include use of depth to build a depth or disparity model of the pixels that are known to belong to a selected region or to exist outside the selected region (e.g., known foreground and known background). Some embodiments compute and use probabilistic color models by computing P(color|foreground) and P(color|background), and then derive P(foreground|color). In a manner analogous to such a calculation and derivation, embodiments can compute P(disparity|foreground), P(disparity|background), and then derive P(foreground|disparity) from the disparities at pixels in the user's foreground and background strokes. Such embodiments incorporate objective function terms similar to those using probability models for color can to improve object selection when depths distinguish the object to be selected from the rest of the image.

Some embodiments utilize depth/disparity information to encourage segmentation between points inside and outside a region to occur at boundaries consistent with depth discontinuities. Such embodiments achieve results that prove useful when the object to be selected is far in front of the background. Such embodiments may achieve results that are less helpful where there is actually no depth discontinuity between an object and a second object. An example of such an object boundary without a depth continuity arises in a case in which a vase to be selected meets a table and there is no depth difference, but a user desires place a segmentation boundary there between a selected region and a non-selected region at the line at which the vase meets the table. Therefore, embodiments vary in the use and inclusion of this term. A user-defined weight is added to depth/disparity terms in some embodiments. Even if a disparity edge term is not correct for all points along a boundary of an object to be selected, inclusion may prove worthwhile in combination with a common selection term that encourages segmentation boundaries to occur along image edges (e.g., color discontinuities). In some embodiments, the color discontinuity term may be given a higher weight than the depth discontinuity term in order to place a segmentation boundary where there is a color discontinuity but no depth discontinuity (e.g. between the bottom of the vase and the table in the example discussed above). Specifically, some embodiments include a depth discontinuity term of the form: $\lambda_D * \Sigma\{\text{neighbor pixels } p_i, p_j \text{ in left input image}\} |x_i - x_j| \exp(-f(|d_i - d_j|))$, where $f(u)$ is an increasing function of u, $|d_i - d_j|$ is the absolute difference in disparity at neighboring pixels $p_i$ and $p_j$, and $x_i$ and $x_j$ are selection labels (0 or 1) for pixels $p_i$ and $p_j$. Embodiments may employ functions other than $\exp(-v)$, including those that work directly with depth instead of disparity. Some embodiments also have similar terms that sum over neighboring pixels in the right image. Some embodiments substitute a disparity gradient operator that examines disparities in a larger neighborhood instead of just a simple difference of disparities at neighboring pixels.

Example Implementations

Figure 8A:
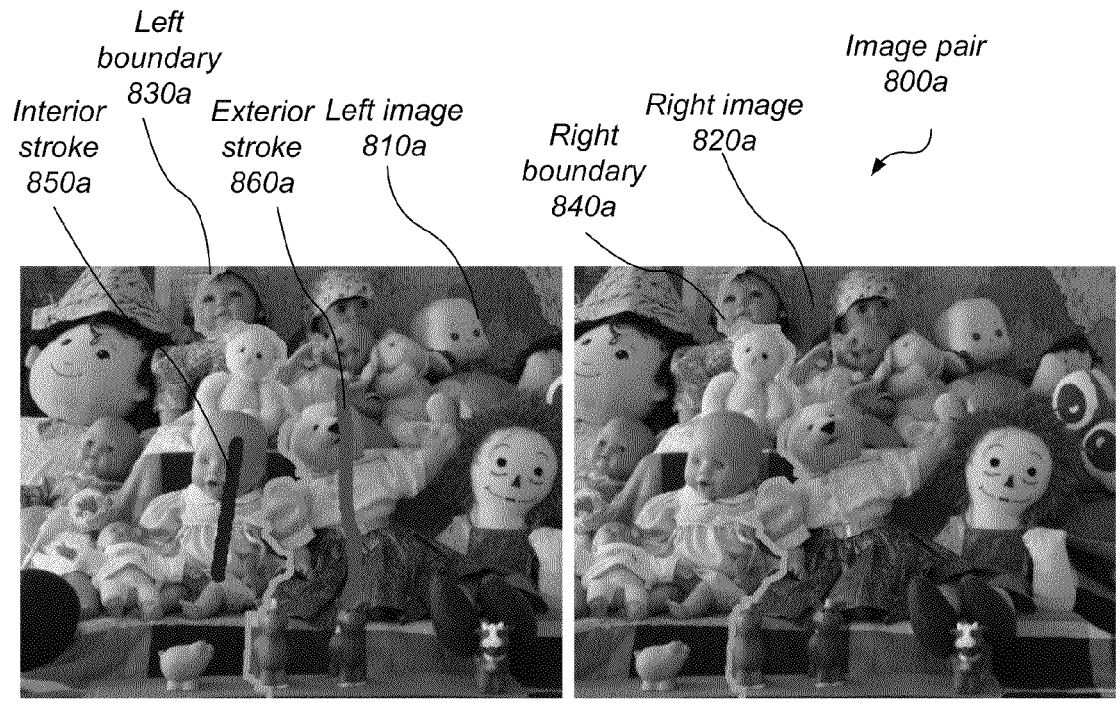
FIGS. 8A-8F illustrate an interactive process of object selection performed iteratively according to some embodiments.
Figure 8B:
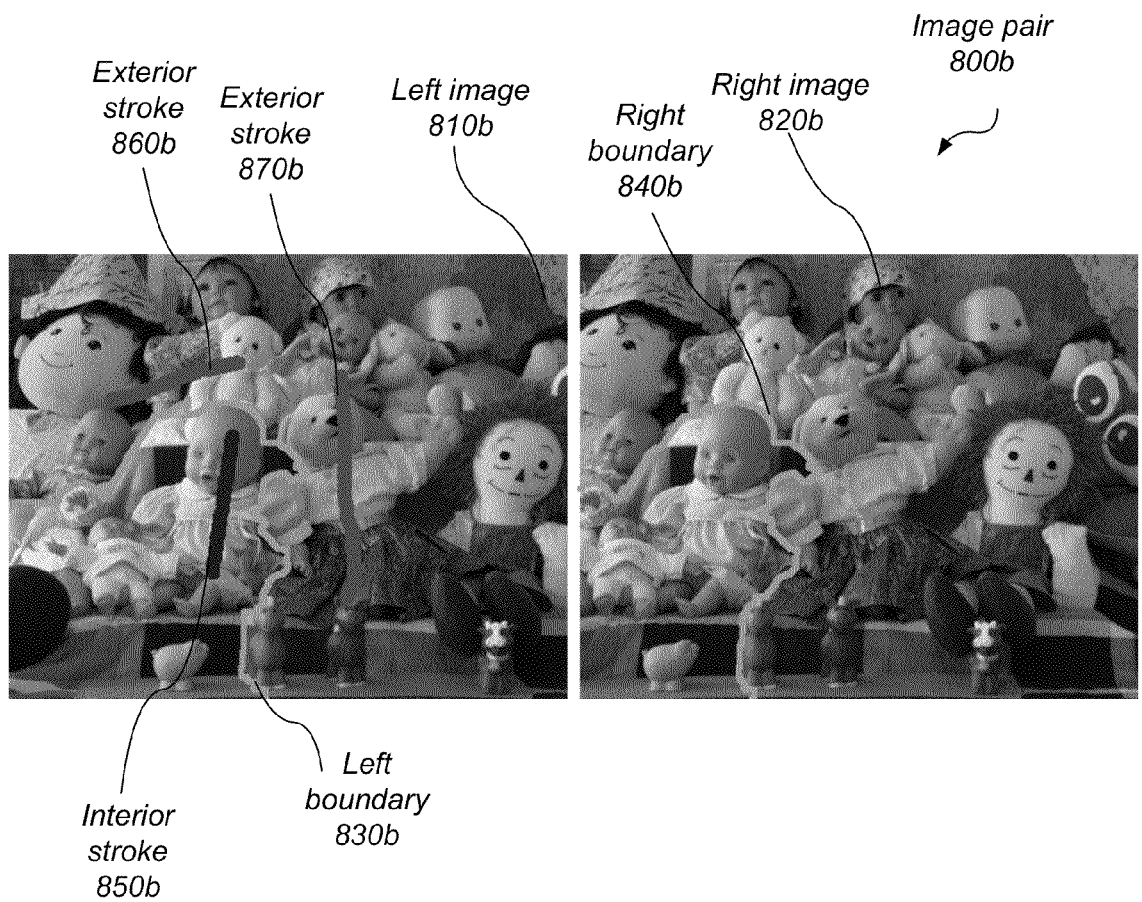
Figure 8C:
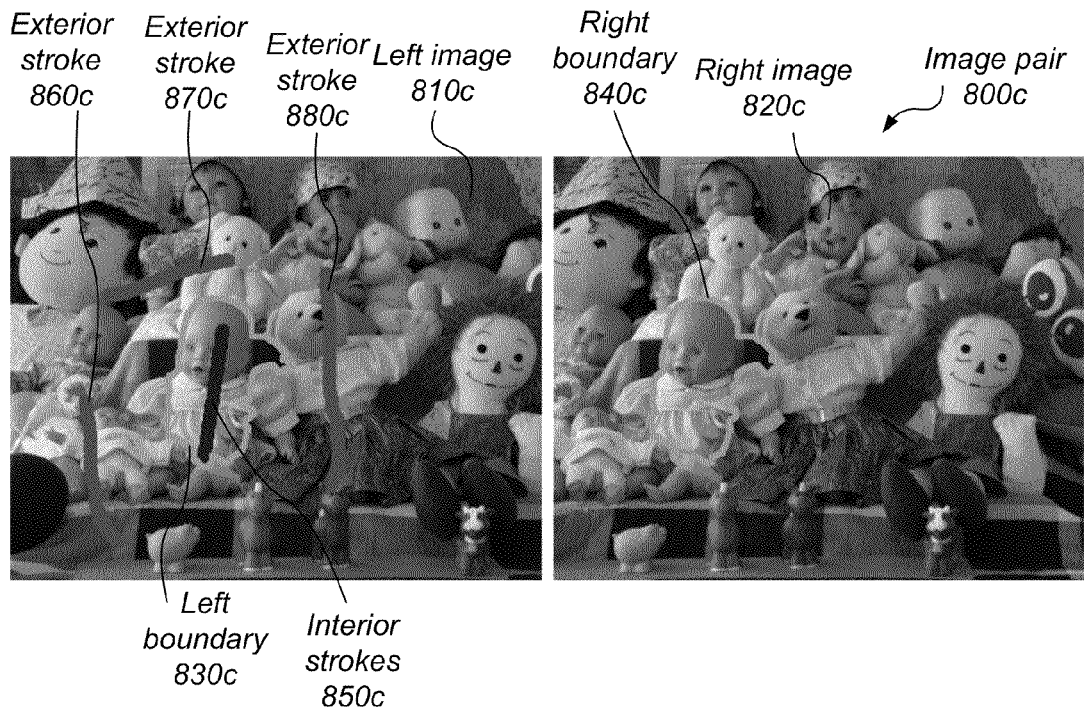
Figure 8D:
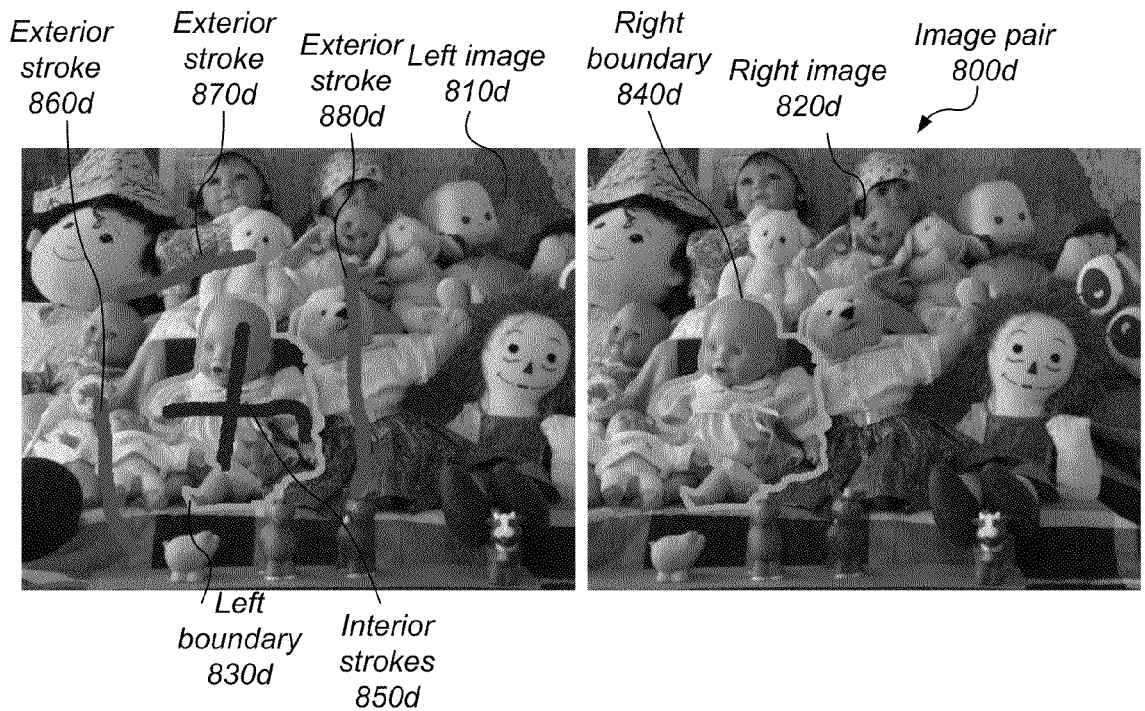
Figure 8E:
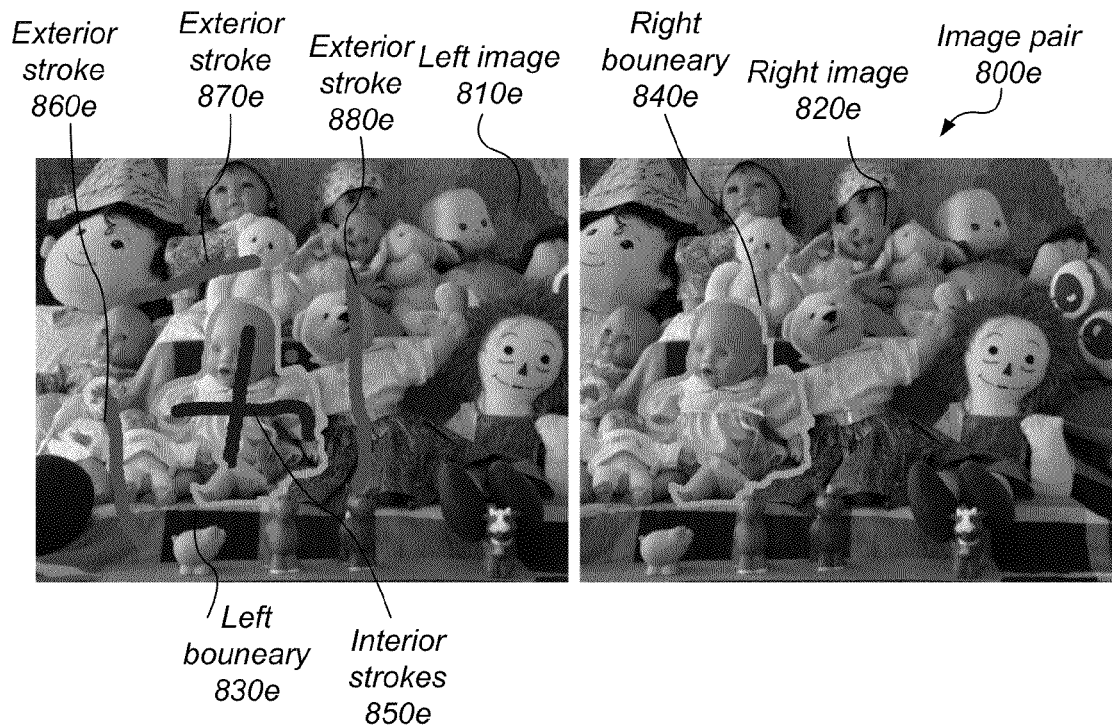
Figure 8F:
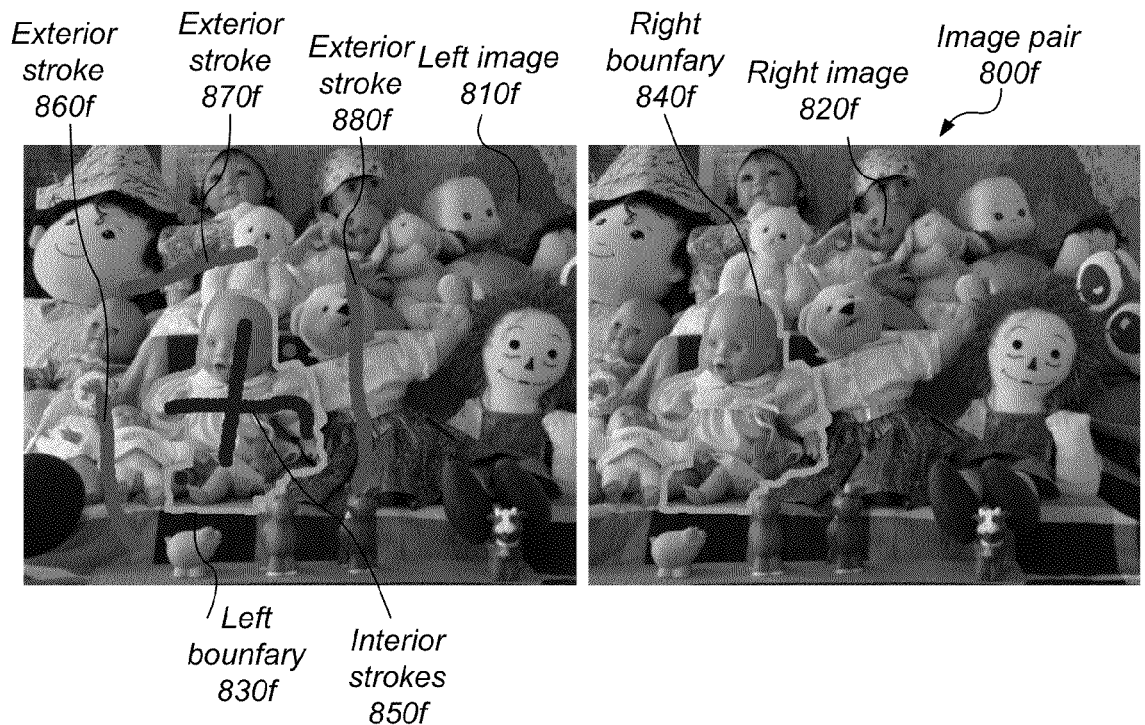
Figure 9:
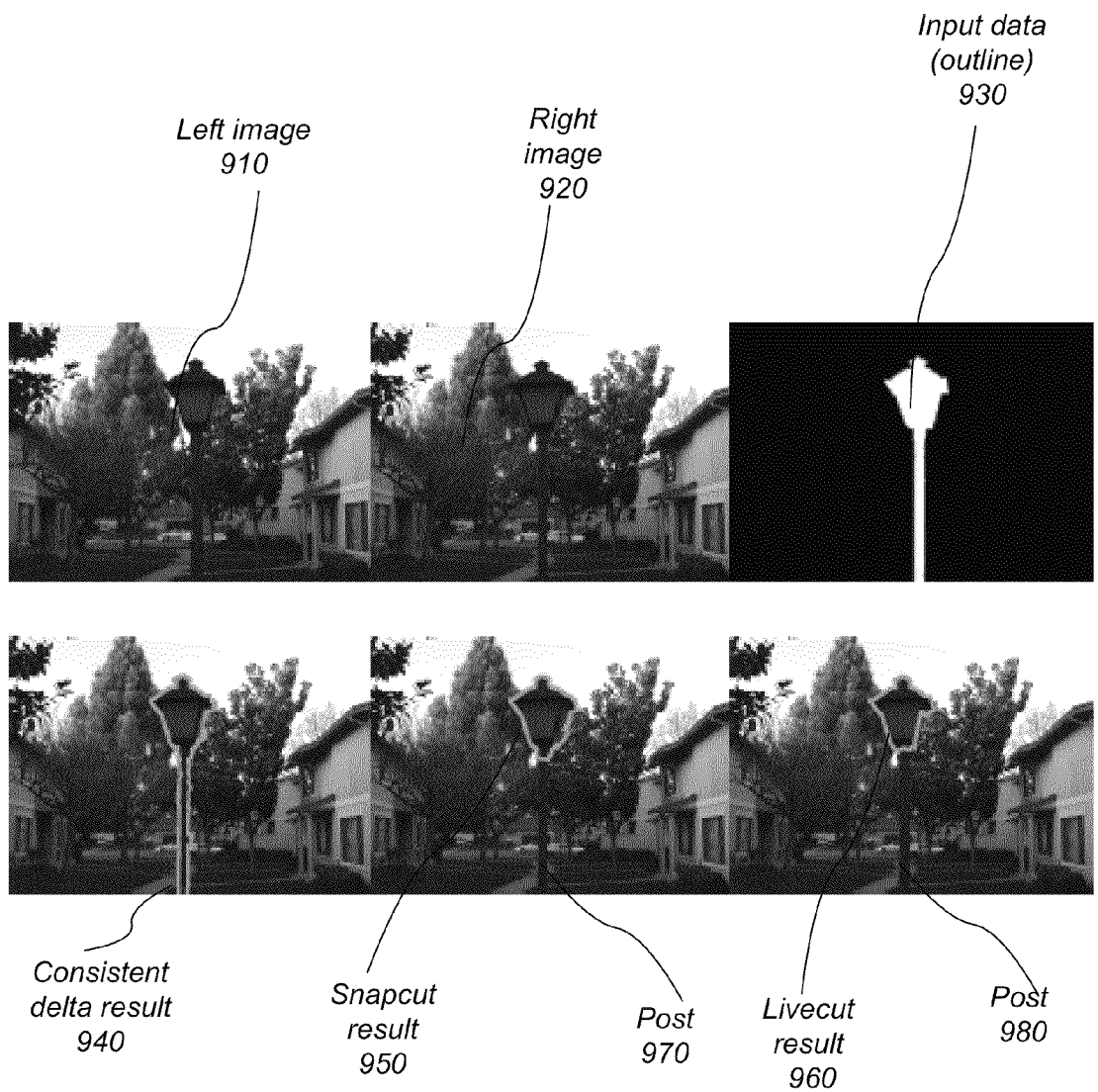
FIG. 9 depicts a comparison of embodiments to previously existing methods of object selection.
Figure 10:
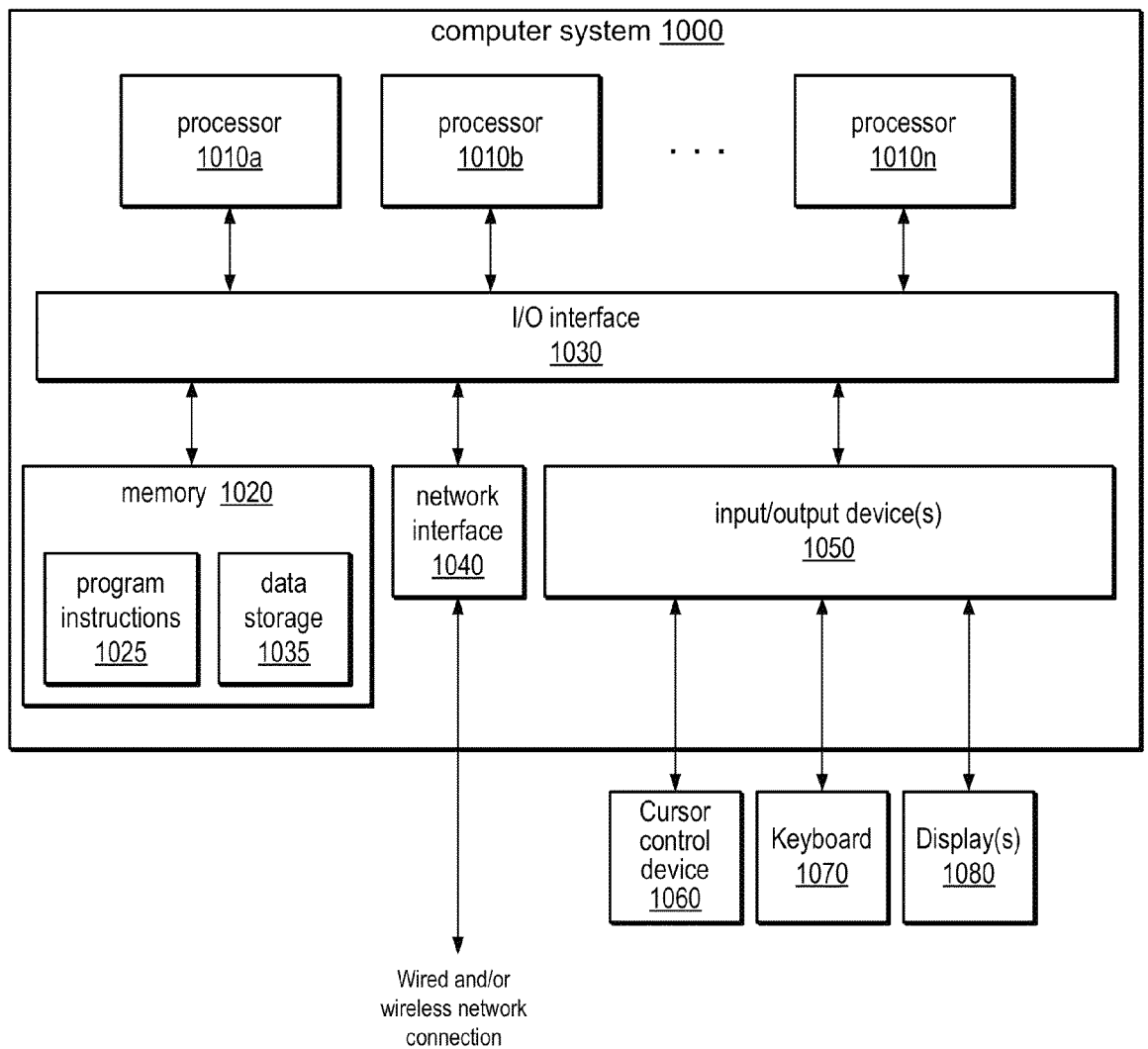
FIG. 10 illustrates an example computer system that may be used in embodiments.

FIG. 1 illustrates an object selection module that may implement one or more of the object selection techniques and tools illustrated in FIGS. 2 through 11. Object selection module 120 may, for example, implement one or more of an interactive object selection user interface and an interactive object selection tool. FIG. 10 illustrates an example computer system on which embodiments of object selection module

Figure 6A:
FIGS. 6A-6H illustrate results of various correspondence models that may be used to implement object selection in stereo image pairs according to some embodiments.
Figure 6B:

120 may be implemented. Object selection module 120 receives as input two or more digital images, labeled as input images 110, such as a stereo image pair. An example stereo image pair is shown in FIGS. 6A-6B. Object selection module 120 may receive user input 112 activating an interactive object selection tool. Object selection module 120 then may then select objects from the input image(s) 110, according to user input 112 received via user interface 122, using the activated interactive object selection tool. The user may activate an interactive object selection tool, including, for example one employing a different probability density function, and provide further input for refining the selection, and/or may activate other tools and further edit the image. Object selection module 120 generates as output one or more image selection data structures 130. Image selection data structures 130 indicate boundaries of regions in input images 110 that represent boundaries of a shared visual feature. Image selection data structures 130 may, for example, be stored to a storage medium 140, such as system memory, a disk drive, DVD, CD, etc.

In some embodiments, object selection module 120 may provide a user interface 122 via which a user may interact with object selection module 120, for example to activate a interactive object selection tool, to perform a selection gesture, and to perform a de-selection or correction gesture as described herein. In some embodiments, user interface 122 may provide user interface elements whereby the user may select options including, but not limited to, a brush size, mathematical options such as a particular probability density function, and/or disparity, and weighting factors.

Embodiments provide an interactive object selection tool for stereoscopic image pairs. In such embodiments, the user provides input on either or both images and immediately sees the resulting selection, allowing embodiments to achieve an acceptable with a minimum of user interaction. Object selection module 120 performs selection by minimizing an energy function jointly over both images. In some embodiments, selection by minimizing an energy function is performed using a graph cut operation. Alternative embodiments, however, use functions other than a graph cut operation to perform the selection. In addition to region and boundary terms, embodiments use a correspondence term to link the two images together. Correspondence information used by the correspondence term is provided by a probability density function for each pixel over all possible corresponding pixels. Embodiments accommodate use of probability density functions reflecting several probability distributions. Such probability distributions include distributions generated by stereo matching algorithms. As one of skill in the art will readily realize from having read the present disclosure, the ability to accommodate probability density functions from any stereo matching algorithm provides embodiments with flexibility sufficient to incorporate information from future stereo-matching methods. To accelerate the graph cut optimization for interactive use, some embodiments select the object on a low-resolution version of the images and refine the selections using graph cut on a narrow band around the low-resolution boundary.

A probability density function module 150 performs in support of interactive object selection mathematical operations related to the probability of relationships between given pixels in the stereo image pair. A probability density function, or density of a continuous random variable, is a function that describes the relative likelihood for the random variable to occur at a given point.

Given two stereo images $I^L$ and $I^R$, the functions below are explained on the basis of the assumption that X is a set of labels (object=1 or background=0) with a label corresponding to each pixel in $I^L$ and $I^R$. Embodiments address the problem of selecting objects in stereoscopic image pairs as an energy minimization problem of the form:

$$E(X) = \lambda_R \sum_{p_i \in I} R(p_i, x_i) + \qquad (1)$$
$$\lambda_B \sum_{(p_i,p_j) \in N_B} B(p_i, p_j)|x_i - x_j| + \lambda_C \sum_{(p_i,p_j) \in N_C} C(p_i, p_j)|x_i - x_j|,$$

where I is the set of all pixels in both images, $N_B$ the set of all neighboring pixels within an image, $N_C$ the set of all possible corresponding pixels between $I^L$ and $I^R$ (within some user-defined maximum disparity $d_{max}$), $x_i$ is the object label of pixel $p_i$, and $\lambda_R$, $\lambda_B$, and $\lambda_C$ are weighting factors. In some embodiments, the energy function is minimized using a graph cut method supported by a graph cut module 170. In embodiments that rely on algorithms other than graph cut, an energy function minimization module 160 performs mathematical operations in support of interactive object selection related to optimization of object selection shapes within the stereo image pair.

Eq. 1 is made up of three primary terms: R, B, and C. R and B are region and boundary terms, respectively, that are represented in graph-cut optimization frameworks and are defined specifically below. C is a pairwise energy term that captures the correspondences between the two images and is defined below. The region term R captures the likelihood of an individual pixel belonging to a foreground region (e.g., a selected object) or a background region (e.g., space that is not part of the selected object). To produce R, embodiments generate a color model of the foreground and background using the pixels that are scribbled over by the user. Some embodiments use a Fast Gauss Transform to compute the color model. Given the foreground and background models $P(c_i|x=1)$ and $P(c_i|x=0)$, embodiments compute R using Bayes Law given equal priors $(P(x=0)=P(x=1)=0.5)$, such that:

$$R(p_i, x_i) = P(x = x_i | c_i) = \frac{P(c_i|x=|x_i)}{P(c_i|x=0) + P(c_i|x=1)}. \qquad (2)$$

The boundary term B measures the similarity of neighboring pixels within a single image. The purpose of B is to encourage neighboring pixels that are similar in color to have the same label. It is defined as:

$$B(p_i, p_j) = e^{-\left(\frac{0.5\|c_i-c_j\|^2}{\sigma^2}\right)^\beta}, \qquad (3)$$

where $\sigma=16$ for $c_i$ in the range [0-255] and $\beta=0.5$.

Embodiments use the correspondence term C for selecting the object simultaneously and consistently in both images $C(p_i; p_j)$ represents the likelihood that $p_i$ corresponds to $p_j$. For a given pixel in the left image $p_L$, embodiments condition the probability of $p_L$ having a given label on the labels of the set of pixels $\{p_R\}$ in the right image along the same epipolar line and within the maximum disparity distance $d_{max}$, or $P(x_L|\{x_R\})$. Embodiments derive $P(x_L|\{x_R\})$ by a process of marginalizing out hidden correspondence variables, which is helped by probability distributions for the correspondences.

Let $M(p_i)$ be a random variable over all possible matches of $p_i$ in the other image. In other words, $M(p_L)$ maps a pixel $p_L$ to one of its possible corresponding pixels $\{p_R\}$ in the other image according to a probability distribution $fp_L$ modeling the probability of $p_L$ corresponding to each pixel in $\{p_R\}$. Then $$P(x_L | \{x_R\}) = \int_{M(p_L)} P(x_L, M(p_L) | \{x_R\}) dM(p_L) \quad (4)$$

$$= \int_{M(p_L)} P(x_L | M(p_L), \{x_R\}) P(M(p_L) | \{x_R\}) dM(p_L)$$

by marginalizing over M. Note that the probability of two pixels matching is independent of the selection labels, so $P(M(p_L) | \{x_R\}) = P(M(p_L))$ (5). Given a discrete set of correspondences, embodiments yield:

$$P(x_L | \{x_R\}) = \sum_{M(p_L)} P(x_L | M(p_L), \{x_R\}) P(M(p_L)). \quad (6)$$

or for a given $p_R$, $P(x_L|x_R) = P(x_L|M(p_L) = p_R; x_R) P(M(p_L) = p_R)$ (7).

In words, the probability of assigning a label to pixel $p_L$ given a particular pixel $p_R$ to which $p_L$ might correspond is the product of two factors. The first factor is the probability of $p_L$ having the same label as $p_R$ if they are corresponding. The second factor is the probability that $p_L$ and $p_R$ actually correspond. Embodiments use these probabilities to define an asymmetric correspondence term $\hat{C}$, where $\hat{C}(p_i, p_j) = P(x_i | M(p_i) = p_j, x_j) P(M(p_i) = p_j)$ (8). The symmetric correspondence term C used in Eq. 1 is $$C(p_i, p_j) = \frac{\hat{C}(p_i, p_j) + \hat{C}(p_j, p_i)}{2}. \quad (9)$$

For the first factor in Eq. 8, if $p_i$ and $p_j$ do correspond, then embodiments execute more effectively if $x_i = x_j$. Therefore, $P(x_i | M(p_i) = p_j; x_j) = 1$ if $x_i = x_j$ and zero otherwise. Unfortunately, current stereo matching algorithms are imperfect. As a result, embodiments compute this factor based on the similarity of the pixels:

$$P(x_i | M(p_i) = p_j, x_j) = e^{-\left(\frac{0.5\|c_i - c_j\|^2}{\sigma^2}\right)^\beta}.$$

This computation provides an added check on the input correspondence information. Note that this is the same equation used for the boundary term B in Eq. 3. The second factor in Eq. 8 is the probability that $p_i$ and $p_j$ correspond. This is determined based on the probability mass function $f_{p_i}$ of the random variable $M(p_i)$. Because M represents the correspondences between the two images, embodiments employ stereo matching information to construct a probability density function. Embodiments can flexibly incorporate stereo matching information from any algorithm as a probability density function, such that future improvements in matching can directly improve the performance of embodiments.

Example User Interface

Figure 2:
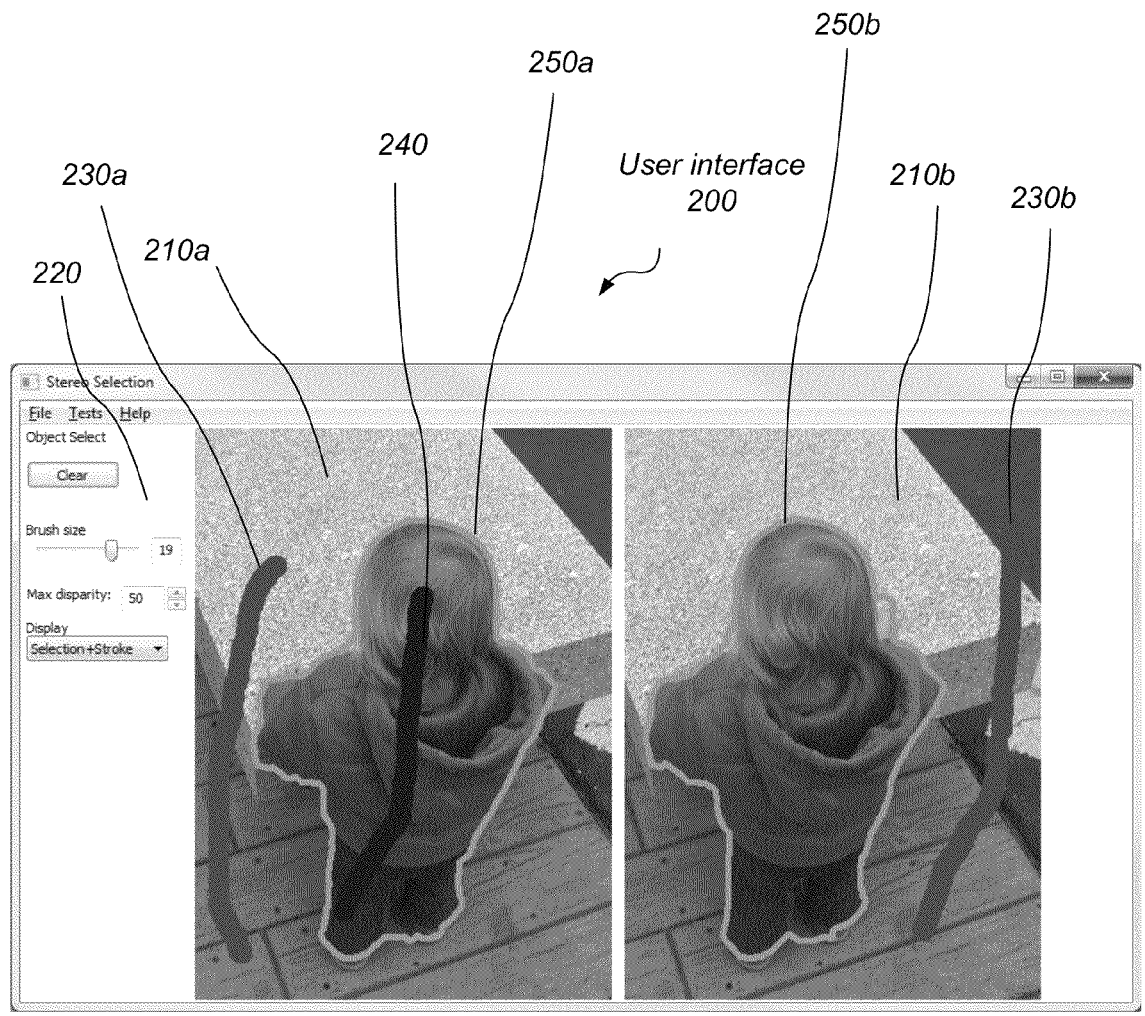
FIG. 2 illustrates a user interface that may be used to implement object selection in stereo image pairs according to some embodiments.

FIG. 2 illustrates a user interface that may be used to implement interactive object selection in stereo image pairs according to some embodiments. User interface 200 contains a first image display area 210a and a second image display area 210b. A control interface area 220 provides an interface for receiving user input with respect to options and commands for operating the interactive object selection tool. Exterior strokes 230a and 230b reflect input data indicating regions outside of a selected object within first image display area 210a and second image display area 210b, respectively. Interior stroke 240 reflects input data indicating a region inside of a selected object within first image display area 210a and second image display area 210b, respectively. The interactive object selection tool presents boundary 250a and boundary 250b of respective regions representing the selected object within first image display area 210a and second image display area 210b, respectively.

The user selects the desired object by drawing scribbles on the image first image display area 210a and second image display area 210b indicating foreground and background, e.g. regions inside and outside the selected object, respectively. Both left and right images are presented to the user in first image display area 210a and second image display area 210b, who may scribble foreground and background strokes on either image and switch back and forth between images during the selection process to interact with whichever image is most convenient. Some embodiments are designed on the assumption that the image pair has been rectified so that correspondences occur along scanlines.

Example Operations Performed in Interactive Object Selection

Figure 3:
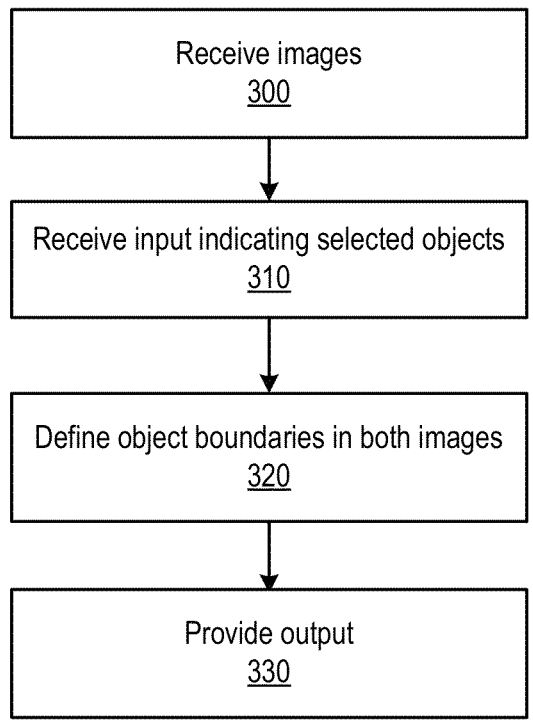
FIG. 3 depicts a high-level logical flowchart of operations used to implement object selection in stereo image pairs according to some embodiments.

FIG. 3 depicts a high-level logical flowchart of operations used to implement interactive object selection in stereo image pairs according to some embodiments. Images are received (block 300). Examples of input images are described below with respect to 6A-6B. Input indicating selected objects is received (block 310). In one embodiment, input data is received in a display of a set of multiple digital images comprising a stereo image pair. The input data indicates a location within a region of a digital image of the stereo image pair.

Object boundaries are defined in both images (block 320). In one embodiment, components described above with respect to FIG. 1 define object boundaries by defining a boundary of a region in a first image and a corresponding boundary of a corresponding region of another digital image of an image pair based on the input data and the content of the images. In some embodiments, the process of defining boundaries for an object selection includes constructing a probability distribution for the first digital image and another probability distribution for the other digital image. In some embodiments, such probability distributions are received from external sources and used. The probability distribution represents a probability that each pixel of a set of pixels of the digital image is within the region. The other probability distribution represents a probability that each pixel of another set of pixels of the other digital image is within the corresponding region. The probability distribution and the other probability distribution are based on correspondence probabilities between each pixel of the set of pixels and respective ones of the other set of pixels. Output is provided (block 330). In some embodiments, output is provided in the form of region boundaries presented in a user interface, as is discussed above with respect to FIG. 2. In other embodiments, output is provided as an image selection data structure.

Figure 4:
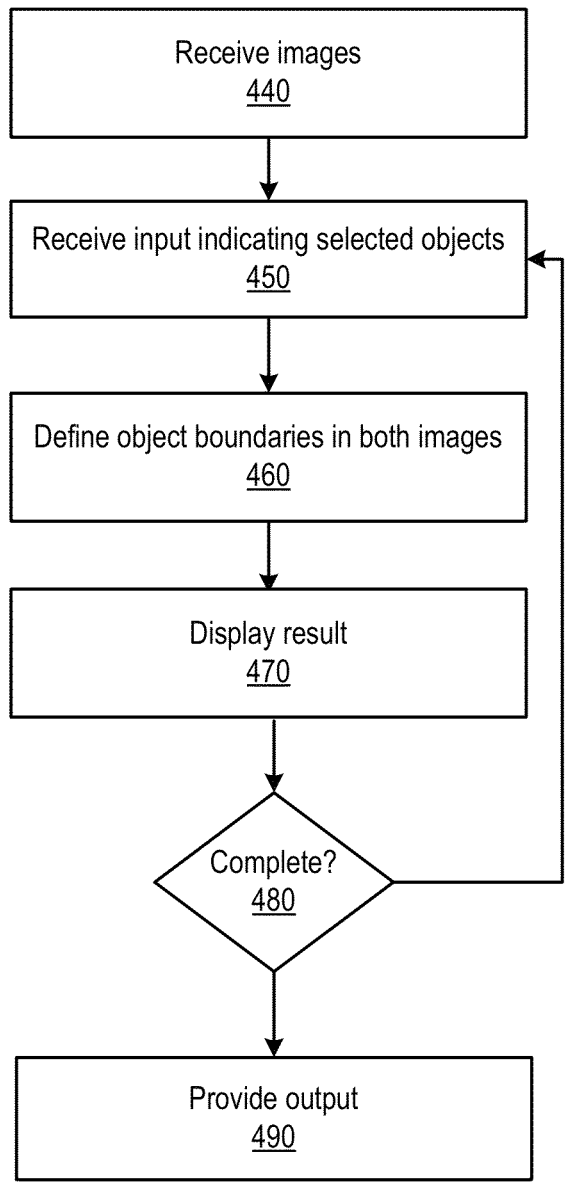
FIG. 4 illustrates a high-level logical flowchart of operations used to implement iterative interactive object selection in stereo image pairs according to some embodiments.

FIG. 4 illustrates a high-level logical flowchart of operations used to implement iterative interactive object selection in stereo image pairs according to some embodiments. Images are received (block 440). Examples of input images are described below with respect to 6A-6B. Input indicating selected objects is received (block 450). In one embodiment, input data is received in a display of a set of multiple digital images comprising a stereo image pair. The input data indicates a location within a region of a digital image of the stereo image pair.

Object boundaries are defined in both images (block 460). In one embodiment, components described above with respect to FIG. 1 define object boundaries by defining a boundary of the region in a first image and a corresponding boundary of a corresponding region of another digital image of an image pair based on the input data and the content of the images. In some embodiments, the process of defining regions for object selection includes constructing a probability distribution for the first digital image and another probability distribution for the other digital image. The probability distribution represents a probability that each pixel of a set of pixels of the digital image is within the region. The other probability distribution represents a probability that each pixel of another set of pixels of the other digital image is within the corresponding region. The probability distribution and the other probability distribution are based on correspondence probabilities between each pixel of the set of pixels and respective ones of the other set of pixels.

A result is displayed (block 470). In some embodiments, the displayed result is provided in the form of region boundaries presented in a user interface, as is discussed above with respect to FIG. 2. In some embodiments, displaying the result includes displaying the boundary of the region in a display of the digital image in which the user input was received and displaying the corresponding boundary of the corresponding region in a display of the other digital image.

A determination is made as to whether the selection is complete (block 480). In some embodiments, the determination as to whether the selection is complete is negative unless the user indicates through a control interface that the selection is complete. If the selection is not complete, the process returns to block 450, which is described above. In some embodiments, return to block 450 allows for receipt of other input data, such that the other input data indicates a location with respect to which modification of the boundary and the corresponding boundary is requested. In some embodiments, the other input data is received in the display of the other digital image or the digital image for use in modifying the boundary and the corresponding boundary in response to the other item of input data. If the selection is complete, output is provided (block 490).

Embodiments of the above-described method for interactively selecting objects from stereoscopic image pairs use the epipolar structure in stereo problems to allow stereo correspondence information to augment the color and contrast cues in a graph-cut, or other, optimization to effectively and consistently segment objects. The inclusion of the correspondence as a probability distribution is not only an effective way of propagating selection information between the two images but also is flexible enough to allow future advances in stereo matching to immediately improve results. For stereo matching algorithms that do not enforce consistency in the correspondences and for handling occlusions, embodiments demonstrate how to enforce consistency on the distributions and demonstrate the improved performance for the selection task.

Example Probability Density Functions

Embodiments support a wide range of probability density functions. If there is no prior knowledge of the correspondences, a uniform probability density function may be used by embodiments. Such a uniform probability density function may be of the form:

$$f_{pi}(p_j) = \frac{1}{n}, \quad (11)$$

given n possible disparity values. When using this uniform probability density function, all correspondences will receive the same weight. Use of this uniform probability density function means that only the color difference will be used by embodiments to set the cost of two pixels having the same label.

If only disparities are provided to the algorithm, embodiments may use a probability distribution that assigns all the probability to one pixel based on the disparity:

$$f_{pi}(p_j) = \begin{cases} 1 & \text{if } |p_i - p_j| = d_i \\ 0 & \text{otherwise.} \end{cases} \quad (12)$$

When embodiments use a delta function as the probability density function for a given pixel, the correspondence term C in Eq. 1 acts like a smoothness term but across images and accounting for correspondences. Such embodiments leverage accurate knowledge of disparities, but use of a probability distribution that assigns all the probability to one pixel based on the disparity may prove less desirable in embodiments selected for use without accurate knowledge of disparities.

Many stereo matching algorithms can compute not only disparities but also probabilities that a pixel $p_i$ matches each possible corresponding pixel in the other image. For example, embodiments may use belief propagation to compute a probability density function at each pixel over the possible matches in the other image. Such probability density functions can be directly used in embodiments. Given that a method computes a probability $P^*(p_j|p_i)$, embodiments assign $f_{pi}(p_j) = P^*(p_j|p_i)$.

The delta function in Eq. 12 is potentially asymmetric based on the disparities computed in the left and right images. Inconsistent disparities in pixels generally occur due to occlusion in or off the side of the image and due to errors in stereo matching algorithms that do not enforce consistency. Since occluded pixels do not have a match in the other image and pixels with erroneous disparities will create incorrect matches, embodiments can implement a modification of Eq. 12 so that it only applies when pixel disparities are consistent, such that $$f_{pi}(p_j) = \begin{cases} 1 & \text{if } |p_i - p_j| = d_i \text{ and } |p_i - p_j| = d_j \\ 0 & \text{otherwise.} \end{cases} \quad (14)$$

Employment of such embodiments may produce an $f_{pi}$ with entries that sum to zero. Embodiments allow this in this case, but to enforce proper probability distributions, a uniform distribution may be used instead.

Embodiments may be designed to include a consistency check that is useful for preventing errors or occlusions that reduce reliability of the results of the selection. Just as the delta function can enforce consistency in the disparities, it may be desirable to enforce consistency in the probability distributions $P^*$ computed by stereo matching algorithms. Embodiments may be implemented on the assumption that the disparity consistency check performed in Eq. 14 is not applicable in this case, because arbitrary distributions instead of disparities are the underlying foundation of the factor. Eq. 14, however, can be thought of as multiplying the two delta distributions together, and so can be generalized to allow arbitrary probability distributions by $$f_{pi}(p_j) = \frac{P*(p_i|p_j)P*(p_j|p_i)}{\sum_k P*(p_i|p_k)P*(p_k|p_i)}, \qquad (15)$$

where k is in the range of indices of all possible correspondences of $p_i$. To make two disparity distributions from left to right (or right to left) consistent with one another, embodiments may be implemented such that all the mass is put on nodes of the distribution that specify consistent matches and remove mass from inconsistent matches. This is what is done in the numerator of Eq. 15, while the denominator normalizes the distribution.

Results of Example Embodiments

Evaluating the performance of interactive selection tools is complicated by the degree to which results are highly dependent on the specific input given by the user. A standard method often used in evaluating single image selection results is to measure the accuracy of the segmentation on a set of images given a predefined set of user input strokes. Embodiments were tested by introducing a stereo dataset for evaluating object selections similar to the GrabCut dataset commonly used for evaluating single-image selection.

To evaluate embodiments a new dataset of 31 stereo pairs with ground-truth object selections and user input strokes was created, some of which are illustrated in the figures provided below. The stereo pairs are roughly but not necessarily perfectly rectified. Many are original images but some are taken from the Middlebury dataset website. The ground truth images were generated carefully by hand and include "unknown" regions along the edges of the objects or in areas such as hair where the pixels are actually linear combinations of the colors from the object and the background.

FIG. 5 depicts a table of results of object selection according to some embodiments. A results table 500 provides for comparison of correspondence terms for Video Snapcut 510 and Livecut 520 on a dataset over the truth 530, boundary 540, and stroke 550 input types. The listed error for each column and row combination is the number of mislabeled pixels in both images. No result is given for snapcut on the stroke input because it did not read that input type.

As discussed in this disclosure with respect to FIG. 5, three different input types are used in evaluation of embodiments. In each case discussed in FIG. 5, the input is provided with respect to the left image only, so that any selection in the right image must be propagated from the left image. As one of skill in the art will readily understand in light of having read the present disclosure, some embodiments allow selection input data to be entered in a display of either image. The first input type assessed in FIG. 5 is the ground truth 530 for the left image. Ground truth input assumes that a user has correctly selected the object in one image and measures the error in the second image. The second input type assessed in FIG. 5 is "boundary" input, where the boundary of the object in the left image is dilated and only the pixels outside the dilated boundary are used as foreground and background input. This is boundary input is similar to one of the input types used in the GrabCut database. The final input type is the "stroke" input, where a skeletonization of the object and background in the left image was computed using Matlab and then used to generate strokes. In both the boundary 540 and stroke 550 cases, embodiments are responsible for computing the selection in both the left and right images.

In the discussed test assessed in FIG. 5, the stereo matching algorithm is used for computing both the disparities and probability functions needed for the correspondence methods in order to compare against a common baseline. The results shown in FIG. 5 indicate that the worst performer was the uniform distribution due to its lack of correspondence information. The consistent versions of the delta function and probability density function distributions outperformed the standard version of the respective distributions in all cases but one, indicating that inconsistent disparities are caused by occlusions or errors in the matching algorithm and are dispreferred in the selection process.

The relative performance of the delta function versus the probability density function distribution differed depending on the input type. In general, the methods performed less impressively as the number of labeled pixels decreased. The ground truth provides the most labeled pixel and the stroke input usually the least. FIGS. 6A-6H, which are described below, show an example selection using each correspondence method with the stroke input on the left image only. The selected portion of the object in the right image is then shown. The uniform distribution struggles the most, but even then is able to select much of the object without any correspondence information. The results from the delta distribution and probability density function are fairly similar results in this example.

FIGS. 6A-6H illustrate various correspondence models that may be used to implement interactive object selection in stereo image pairs according to some embodiments. The results shown in FIG. 6A-6H indicate that embodiments outperform previously available methods by using the consistent delta correspondence type, and all correspondence types except the uniform distribution outperformed previously available methods on at least two of the three correspondence types discussed.

Figure 6C:
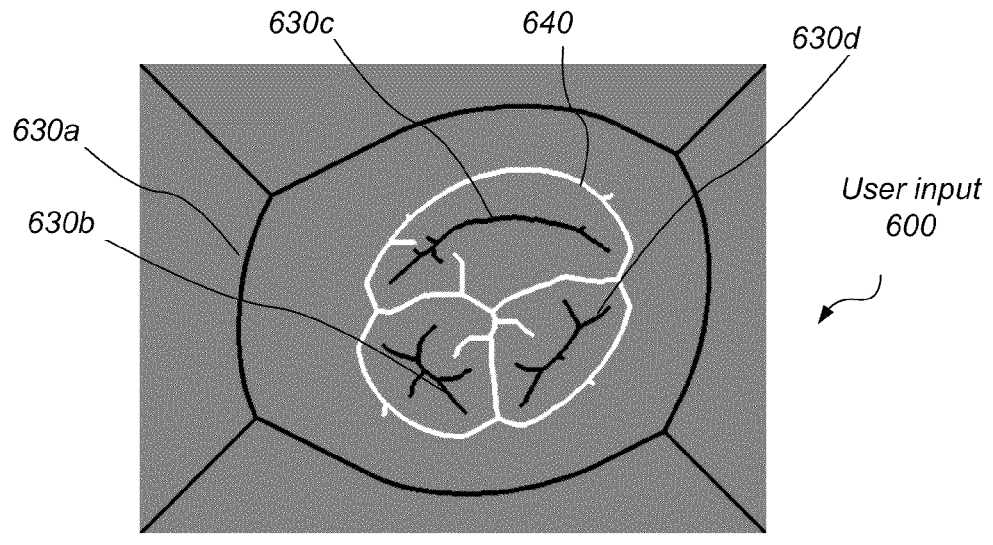

FIG. 6A shows a left input image 610a containing a steering wheel 620a. FIG. 6B shows a right input image 610b containing a steering wheel 620b. FIG. 6C shows example user input 600, in which exterior strokes 630a-630d indicate background objects and interior stokes 640 indicate a foreground object. The tests described below reflect attempts to select steering wheel 620a and 620b by defining a boundary of the region containing steering wheel 620a and a corresponding boundary of a corresponding region containing steering wheel 620b. The boundary and the corresponding boundary represent boundaries of a shared visual feature (e.g., steering wheel 620a and steering wheel 620b) in left image 610a and right image 610b. The defining is based on the input data in the form of exterior strokes 630a-630d and interior strokes 640a-640d, content of left image 610a, and content of right image 610b.

Figure 6D:

FIG. 6D illustrates a result using a uniform probability distribution. Boundary 650d in right image 610d shows the region of the selected object as indicated using a uniform probability distribution function.

Figure 6E:

FIG. 6E illustrates a result using a delta probability distribution. Boundary 650e in right image 610e shows the region of the selected object as indicated using a delta probability distribution function.

Figure 6F:

FIG. 6F illustrates a result using a probability density function probability distribution. Boundary 650f in right image 610f shows the region of the selected object as indicated using a PDF probability distribution function.

Figure 6G:

FIG. 6G illustrates a result using a consistent delta probability distribution. Boundary 650g in right image 610g shows the region of the selected object as indicated using a consistent delta probability distribution function.

Figure 6H:

FIG. 6H illustrates a result using a consistent probability density function probability distribution. Boundary 650h in right image 610h shows the region of the selected object as indicated using a consistent probability density function probability distribution function. When enforcing consistency, embodiments using either of delta and probability density function methods improve output with the errors occurring along the top of the wheel being avoided.

Figure 7A:
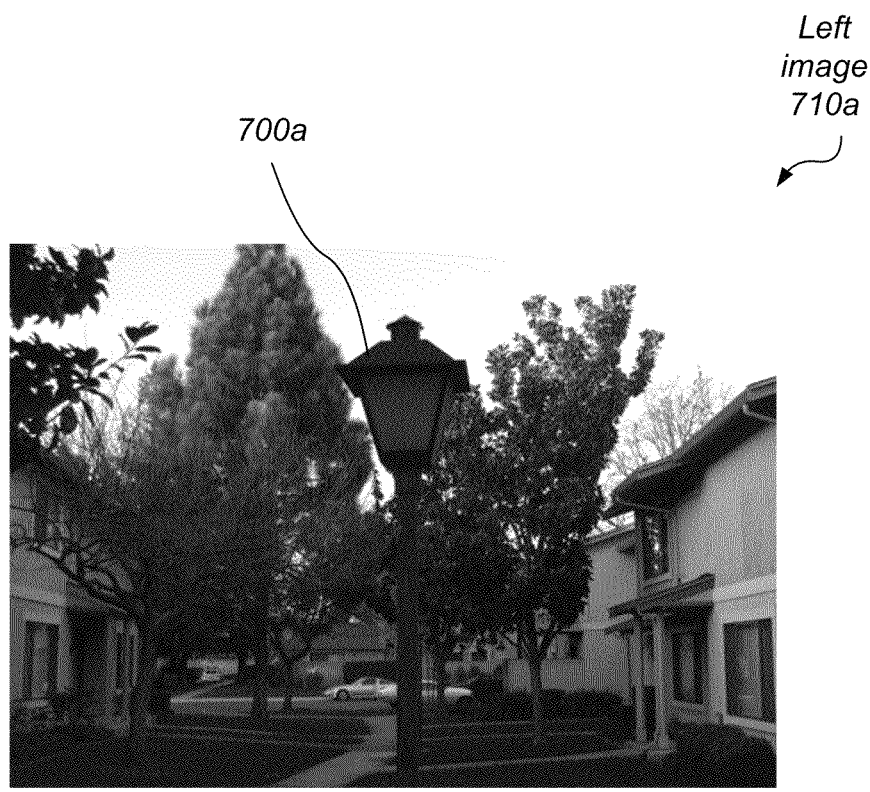
FIG. 7A-7H depict results of various models of object selection.
Figure 7B:
Figure 7C:
Figure 7D:
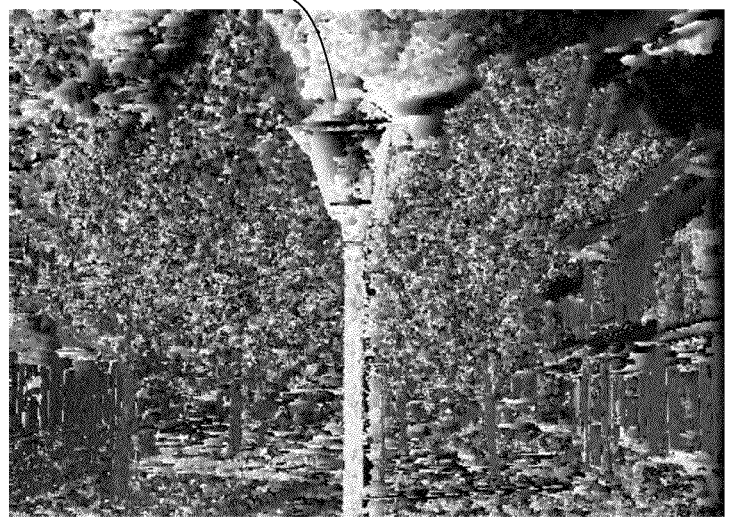
Figure 7E:
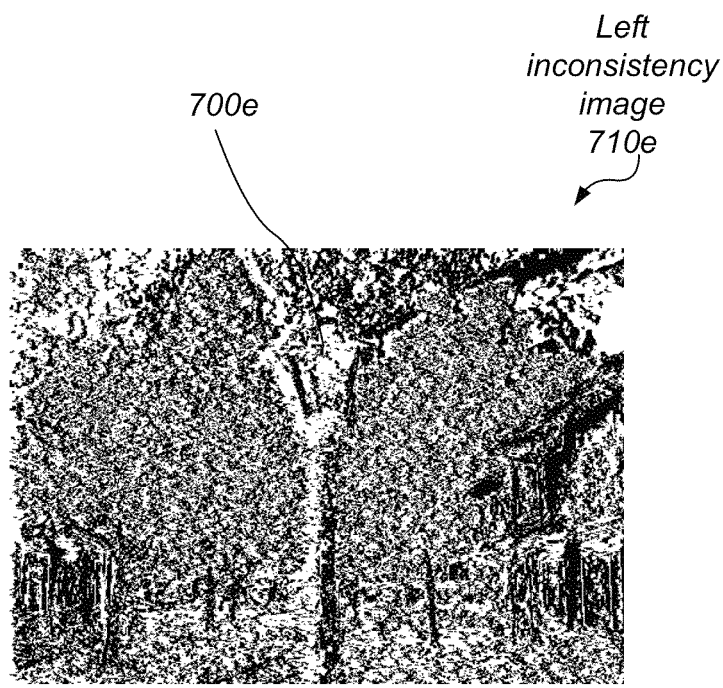
Figure 7F:
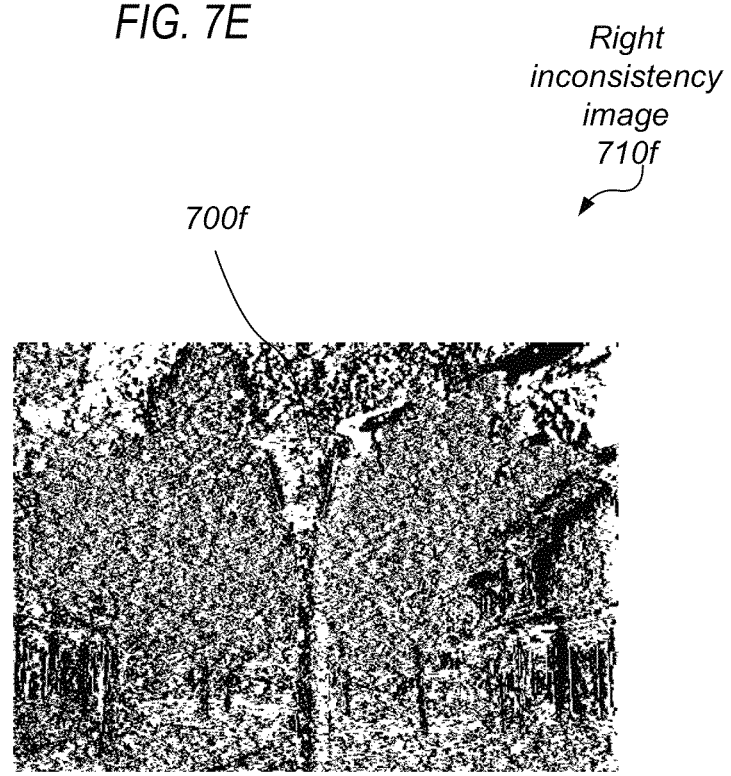

An example of the effect of the consistency check is shown in FIGS. 7A-7H. The disparities generated are very noisy and many inconsistencies occur. These inconsistencies are shown in FIGS. 7E-7F as white pixels. Some embodiments employing a delta correspondence method use all the disparities and produce a result with a large error. Some embodiments employing a consistent delta method, on the other hand, ignore the inconsistent disparities and are able to avoid the large error.

FIGS. 7A-7H illustrate use of a disparity model. FIG. 7A depicts a left image 710a including a lamppost 700a. FIG. 7B depicts a right image 710b including a lamppost 700b. FIG. 7C depicts a left disparity 710c including a lamppost 700c. FIG. 7D depicts a right disparity 710d including a lamppost 700d. FIG. 7E depicts a left inconsistency image 710e including a lamppost 700e. FIG. 7F depicts a right inconsistency image 710f including a lamppost 700f.

Figure 7G:
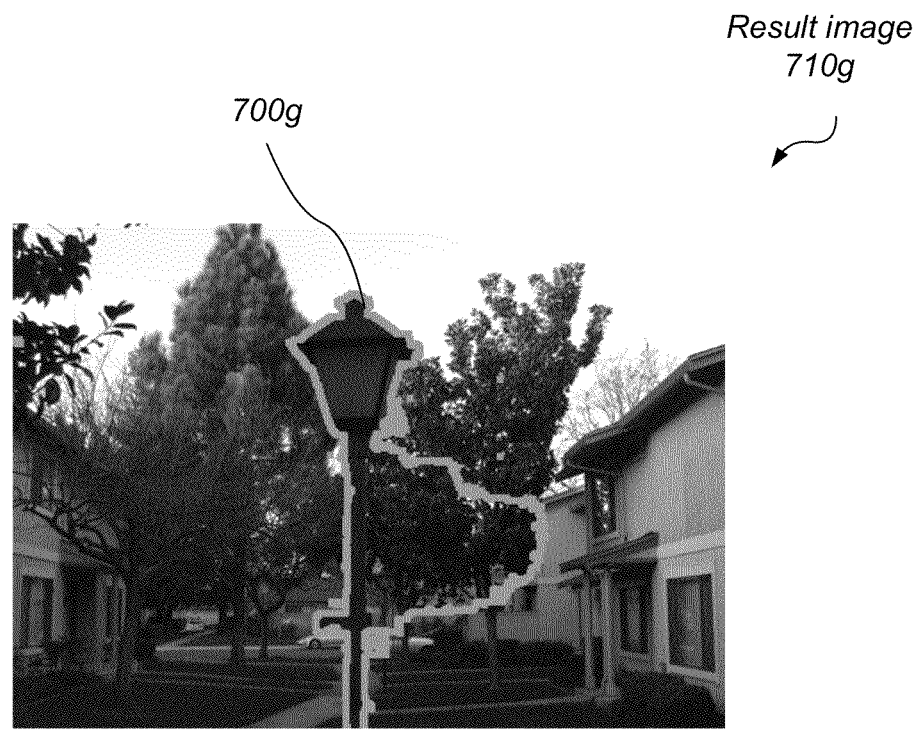
Figure 7H:
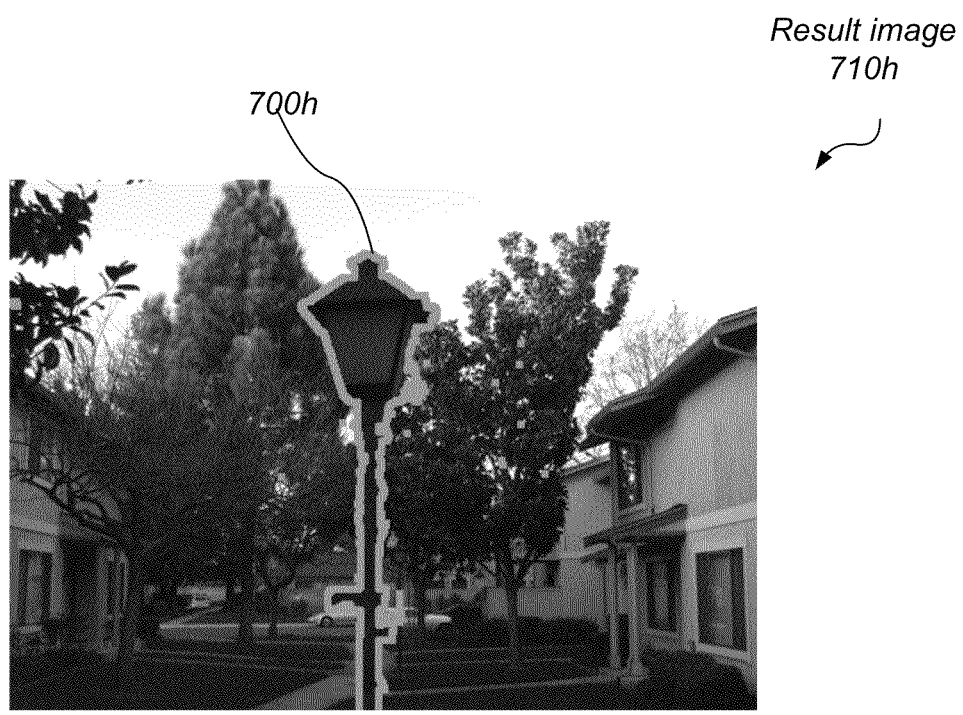

FIG. 7G depicts a result image 710g from a delta method including a boundary 700g. FIG. 7H depicts a result image 710h using a consistent delta function including a boundary 700h. Result image 710h is generated using a consistent delta function with stroke input. Left disparity 710c and right disparity 710d, in which the grayscale values indicate disparity, are generated by belief propagation. Because belief propagation is noisy, left disparity 710c and right disparity 710d are inconsistent, as indicated by right inconsistency image 710f and left inconsistency image 710e, where white indicates inconsistent pixels. The large error to the right of lamppost 700g in result image 710g from a delta method selection is avoided when using the consistent delta method as shown in result image 710h using a consistent delta function.

FIGS. 8A-8F illustrate interactive object selection in an example stereo image pair according to some embodiments. In the results of the embodiment depicted, as the user interacts with the left image, the selection in the right image is updated in a manner consistent with the left selection. FIG. 8A depicts a first set of selection strokes and resultant selection of a boundary in both images. Image pair 800a includes a left image 810a and a right image 820a. Embodiments create a left boundary 830a and a right boundary 840a in response to an interior stroke 850a and an exterior stroke 860a in left image 810a.

FIG. 8B depicts a second set of selection strokes and resultant selection of a boundary in both images. Image pair 800b includes a left image 810b and a right image 820b. Embodiments update and display a left boundary 830b and a right boundary 840b in response to an interior stroke 850b and exterior strokes 860b-870b in left image 810b.

FIG. 8C depicts a third set of selection strokes and resultant selection of a boundary in both images. Image pair 800c includes a left image 810c and a right image 820c. Embodiments update and display a left boundary 830c and a right boundary 840c in response to interior strokes 850c and exterior strokes 860c-880c in left image 810c.

FIG. 8D depicts a fourth set of selection strokes and resultant selection of a boundary in both images. Image pair 800d includes a left image 810d and a right image 820d. Embodiments update and display a left boundary 830d and a right boundary 840d in response to interior strokes 850d and exterior strokes 860d-880d in left image 810d.

FIG. 8E depicts a fifth set of selection strokes and resultant selection of a boundary in both images. Image pair 800e includes a left image 810e and a right image 820e. Embodiments update and display a left boundary 830e and a right boundary 840e in response to interior strokes 850e and exterior strokes 860e-880e in left image 810e.

FIG. 8F depicts a sixth set of selection strokes and resultant selection of a boundary in both images. Image pair 800f includes a left image 810f and a right image 820f. Embodiments update and display a left boundary 830f and a right boundary 840f in response to interior strokes 850f and exterior strokes 860f-880f in left image 810f.

Enforcing consistency also aids in improving the interactive user experience. This is illustrated in FIG. 8, where a cluttered scene is shown at various stages during an interactive selection of a particular doll. For this example, the interaction was restricted to the left image to illustrate the similarity of the selection in the left image to that in the right image. Even though a number of strokes are needed in this example to select the object, the selections at each intermediate stage of the process are quite consistent.

FIG. 9 shows a comparisons of embodiments to prior art attempts to solve the problem of object selection. FIG. 9 depicts a result comparison including a left image 910, a right image 920, and input data (outline) 930. In FIG. 9, ground truth from left image 910 is provided as input data (outline) 930. Embodiments are able to select the lamppost in the right image in consistent delta result 940 with only minor mistakes, while both video snapcut result 950 and livecut result 960 fail to select post 970 and post 980. In some embodiments, correspondence information helps graph cut to avoid its tendency to short-cut long, thin objects in this case.

Example System

Embodiments of an object selection module may be executed on one or more computer systems, which may interact with various other devices. One such computer system is illustrated by FIG. 10. In different embodiments, computer system 1000 may be any of various types of devices, including, but not limited to, a personal computer system, desktop computer, laptop, notebook, or netbook computer, mainframe computer system, handheld computer, workstation, network computer, a camera, a set top box, a mobile device, a consumer device, video game console, handheld video game device, application server, storage device, a peripheral device such as a switch, modem, router, or in general any type of computing or electronic device.

In the illustrated embodiment, computer system 1000 includes one or more processors 1010 coupled to a system memory 1020 via an input/output (I/O) interface 1030. Computer system 1000 further includes a network interface 1040 coupled to I/O interface 1030, and one or more input/output devices 1050, such as cursor control device 1060, keyboard 1070, and display(s) 1080. In some embodiments, it is contemplated that embodiments may be implemented using a single instance of computer system 1000, while in other embodiments multiple such systems, or multiple nodes making up computer system 1000, may be configured to host different portions or instances of embodiments. For example, in one embodiment some elements may be implemented via one or more nodes of computer system 1000 that are distinct from those nodes implementing other elements.

In various embodiments, computer system 1000 may be a uniprocessor system including one processor 1010, or a multiprocessor system including several processors 1010 (e.g., two, four, eight, or another suitable number). Processors 1010 may be any suitable processor capable of executing instructions. For example, in various embodiments, processors 1010 may be general-purpose or embedded processors implementing any of a variety of instruction set architectures (ISAs), such as the x86, PowerPC, SPARC, or MIPS ISAs, or any other suitable ISA. In multiprocessor systems, each of processors 1010 may commonly, but not necessarily, implement the same ISA.

In some embodiments, at least one processor 1010 may be a graphics processing unit. A graphics processing unit or GPU may be considered a dedicated graphics-rendering device for a personal computer, workstation, game console or other computing or electronic device. Modern GPUs may be very efficient at manipulating and displaying computer graphics, and their highly parallel structure may make them more effective than typical CPUs for a range of complex graphical algorithms. For example, a graphics processor may implement a number of graphics primitive operations in a way that makes executing them much faster than drawing directly to the screen with a host central processing unit (CPU). In various embodiments, the image processing methods disclosed herein may, at least in part, be implemented by program instructions configured for execution on one of, or parallel execution on two or more of, such GPUs. The GPU(s) may implement one or more application programmer interfaces (APIs) that permit programmers to invoke the functionality of the GPU(s). Suitable GPUs may be commercially available from vendors such as NVIDIA Corporation, ATI Technologies (AMD), and others.

System memory 1020 may be configured to store program instructions and/or data accessible by processor 1010. In various embodiments, system memory 1020 may be implemented using any suitable memory technology, such as static random access memory (SRAM), synchronous dynamic RAM (SDRAM), nonvolatile/Flash-type memory, or any other type of memory. In the illustrated embodiment, program instructions and data implementing desired functions, such as those described above for embodiments of a object selection module are shown stored within system memory 1020 as program instructions 1025 and data storage 1035, respectively. In other embodiments, program instructions and/or data may be received, sent or stored upon different types of computer-accessible media or on similar media separate from system memory 1020 or computer system 1000. Generally speaking, a computer-accessible medium may include storage media or memory media such as magnetic or optical media, e.g., disk or CD/DVD-ROM coupled to computer system 1000 via I/O interface 1030. Program instructions and data stored via a computer-accessible medium may be transmitted by transmission media or signals such as electrical, electromagnetic, or digital signals, which may be conveyed via a communication medium such as a network and/or a wireless link, such as may be implemented via network interface 1040.

In one embodiment, I/O interface 1030 may be configured to coordinate I/O traffic between processor 1010, system memory 1020, and any peripheral devices in the device, including network interface 1040 or other peripheral interfaces, such as input/output devices 1050. In some embodiments, I/O interface 1030 may perform any necessary protocol, timing or other data transformations to convert data signals from one component (e.g., system memory 1020) into a format suitable for use by another component (e.g., processor 1010). In some embodiments, I/O interface 1030 may include support for devices attached through various types of peripheral buses, such as a variant of the Peripheral Component Interconnect (PCI) bus standard or the Universal Serial Bus (USB) standard, for example. In some embodiments, the function of I/O interface 1030 may be split into two or more separate components, such as a north bridge and a south bridge, for example. In addition, in some embodiments some or all of the functionality of I/O interface 1030, such as an interface to system memory 1020, may be incorporated directly into processor 1010.

Network interface 1040 may be configured to allow data to be exchanged between computer system 1000 and other devices attached to a network, such as other computer systems, or between nodes of computer system 1000. In various embodiments, network interface 1040 may support communication via wired or wireless general data networks, such as any suitable type of Ethernet network, for example; via telecommunications/telephony networks such as analog voice networks or digital fiber communications networks; via storage area networks such as Fibre Channel SANs, or via any other suitable type of network and/or protocol.

Input/output devices 1050 may, in some embodiments, include one or more display terminals, keyboards, keypads, touchpads, scanning devices, voice or optical recognition devices, or any other devices suitable for entering or retrieving data by one or more computer system 1000. Multiple input/output devices 1050 may be present in computer system 1000 or may be distributed on various nodes of computer system 1000. In some embodiments, similar input/output devices may be separate from computer system 1200 and may interact with one or more nodes of computer system 1000 through a wired or wireless connection, such as over network interface 1040.

As shown in FIG. 10, memory 1020 may include program instructions 1025, configured to implement embodiments of a object selection module as described herein, and data storage 1035, comprising various data accessible by program instructions 1025. In one embodiment, program instructions 1025 may include software elements of embodiments of a object selection module as illustrated in the above FIG. 1-9. Data storage 1035 may include data that may be used in embodiments. In other embodiments, other or different software elements and data may be included.

Those skilled in the art will appreciate that computer system 1000 is merely illustrative and is not intended to limit the scope of a object selection module as described herein. In particular, the computer system and devices may include any combination of hardware or software that can perform the indicated functions, including a computer, personal computer system, desktop computer, laptop, notebook, or netbook computer, mainframe computer system, handheld computer, workstation, network computer, a camera, a set top box, a mobile device, network device, internet appliance, PDA, wireless phones, pagers, a consumer device, video game console, handheld video game device, application server, storage device, a peripheral device such as a switch, modem, router, or in general any type of computing or electronic device. Computer system 1000 may also be connected to other devices that are not illustrated, or instead may operate as a stand-alone system. In addition, the functionality provided by the illustrated components may in some embodiments be combined in fewer components or distributed in additional components. Similarly, in some embodiments, the functionality of some of the illustrated components may not be provided and/or other additional functionality may be available.

Those skilled in the art will also appreciate that, while various items are illustrated as being stored in memory or on storage while being used, these items or portions of them may be transferred between memory and other storage devices for purposes of memory management and data integrity. Alternatively, in other embodiments some or all of the software components may execute in memory on another device and communicate with the illustrated computer system via inter-computer communication. Some or all of the system components or data structures may also be stored (e.g., as instructions or structured data) on a computer-accessible medium or a portable article to be read by an appropriate drive, various examples of which are described above. In some embodiments, instructions stored on a computer-accessible medium separate from computer system 1000 may be transmitted to computer system 1000 via transmission media or signals such as electrical, electromagnetic, or digital signals, conveyed via a communication medium such as a network and/or a wireless link. Various embodiments may further include receiving, sending or storing instructions and/or data implemented in accordance with the foregoing description upon a computer-accessible medium. Accordingly, the present invention may be practiced with other computer system configurations.

Conclusion

Various embodiments may further include receiving, sending or storing instructions and/or data implemented in accordance with the foregoing description upon a computer-accessible medium. Generally speaking, a computer-accessible medium may include storage media or memory media such as magnetic or optical media, e.g., disk or DVD/CD-ROM, volatile or non-volatile media such as RAM (e.g. SDRAM, DDR, RDRAM, SRAM, etc.), ROM, etc., as well as transmission media or signals such as electrical, electromagnetic, or digital signals, conveyed via a communication medium such as network and/or a wireless link.

The various methods as illustrated in the Figures and described herein represent example embodiments of methods. The methods may be implemented in software, hardware, or a combination thereof. The order of method may be changed, and various elements may be added, reordered, combined, omitted, modified, etc.

Various modifications and changes may be made as would be obvious to a person skilled in the art having the benefit of this disclosure. It is intended that the invention embrace all such modifications and changes and, accordingly, the above description to be regarded in an illustrative rather than a restrictive sense.

What is claimed is:

1. A method, comprising,
receiving input indicative of a user selection of a shared visual feature shared by a first digital image and a second digital image comprising a stereo image pair in connection with a display of the first digital image and the second digital image in a user interface, the input indicative of a region of the stereo image pair corresponding to the shared visual feature; and
calculating, based on the received input, a boundary of the region corresponding to the user selection that contains the shared visual feature in the first digital image and the second digital image, by constructing probabilities that sets of pixels in the first digital image and the second digital image are within the boundary and correspond to one another; and
selecting the shared visual feature contained within the calculated boundary in both the first digital image and the second digital image of the stereo image pair for subsequent image editing operations.

2. The method of claim 1, further comprising
displaying the boundary of the region of the shared visual feature of the stereo image pair in connection with a display of the first digital image, wherein the input is received in the user interface displaying the first digital image;
displaying the boundary of the region of the shared visual feature in connection with a display of the second digital image;
receiving subsequent input indicative of a region of the stereo image pair to which modification of the boundary is requested, and
modifying the boundary in response to the input.

3. The method of claim 1, wherein the probabilities further comprise correspondence probabilities between the sets of pixels in the first digital image and the second digital image based on comparison of color values of respective pixels.

4. The method of claim 1, wherein the probabilities further comprise correspondence probabilities between the sets of pixels in the first digital image and the second digital image based on comparison of region labels of respective sets of pixels, wherein the region labels identify on a binary basis whether a pixel is within or outside of the region of the stereo image pair corresponding to the shared visual feature indicated by the input.

5. The method of claim 1,
wherein the method further comprises rectifying the first digital image and the second digital image; and
the probabilities include a first probability distribution and a second probability distribution that are restricted to probability of correspondence for points within a selected disparity along a particular scanline of the first digital image and the second digital image.

6. The method of claim 1, wherein the probabilities further comprise correspondence probabilities between the sets of pixels in the first digital image and the second digital image based on comparison of depth values of respective pixels.

7. The method of claim 1, wherein the probabilities further comprise normalized correspondence probabilities between the sets of pixels in the first digital image and the second digital image.

8. A computer-readable storage medium storing program instructions, wherein the program instructions are computer-executable to implement:
receiving input indicative of a user selection of a shared visual feature shared by a first digital image and a second digital image comprising a stereo image pair in connection with a display of the first digital image and the second digital image in a user interface, the input indicative of a region of the stereo image pair corresponding to the shared visual feature; and
calculating, based on the received input, a boundary of the region corresponding to the user selection that contains the shared visual feature in the first digital image and the second digital image, by using probabilities that sets of pixels in the first digital image and the second digital image are within the boundary and correspond to one another; and
selecting the shared visual feature contained within the calculated boundary in both the first digital image and the second digital image of the stereo image pair for subsequent image editing operations.

9. The computer-readable storage medium of claim 8, wherein the probabilities further comprise correspondence probabilities between the sets of pixels in the first digital image and the second digital image based on disparity values calculated between each pixel of the respective pixels, wherein the disparity values represent differences in location between pixels.

10. The computer-readable storage medium of claim 8, further comprising program instructions computer-executable to implement:
   displaying the boundary of the region of the shared visual feature of the stereo image pair in connection with a display of the first digital image, wherein the input is received in the user interface displaying the first digital image;
   displaying the boundary of the region of the shared visual feature in connection with a display of the second digital image;
   receiving subsequent input indicative of a region of the stereo image pair to which modification of the boundary is requested, and
   modifying the boundary in response to the subsequent input.

11. The computer-readable storage medium of claim 8, wherein the probabilities further comprise correspondence probabilities between the sets of pixels in the first digital image and the second digital image based on comparison of color values of respective pixels.

12. The computer-readable storage medium of claim 8, wherein the probabilities further comprise correspondence probabilities between the sets of pixels in the first digital image and the second digital image based on comparison of region labels of respective sets of pixels, wherein the region labels identify on a binary basis whether a pixel is within or outside of the region of the stereo image pair corresponding to the shared visual feature indicated by the input.

13. The computer-readable storage medium of claim 8, wherein the computer-readable storage medium further comprises program instructions computer-executable to implement rectifying the first digital image and the second digital image; and
   the probabilities include a first probability distribution and a second probability distribution that are restricted to probability of correspondence for points within a selected disparity along a particular scanline of the first digital image and the second digital image.

14. The computer-readable storage medium of claim 8, wherein the probabilities further comprise correspondence probabilities between the sets of pixels in the first digital image and the second digital image based on comparison of depth values of respective pixels.

15. A system, comprising:
   at least one processor; and
   a memory comprising program instructions, wherein the program instructions are executable by the at least one processor to:
      receive input indicative of a user selection of a shared visual feature shared by a first digital image and a second digital image comprising a stereo image pair in connection with a display of the first digital image and the second digital image in a user interface, the input indicative of a region of the stereo image pair corresponding to the shared visual feature; and
      calculate, based on the received input, a boundary of the region corresponding to the user selection that contains the shared visual feature in the first digital image and the second digital image, the program instructions executable by the at least one processor to construct probabilities that sets of pixels in the first digital image and the second digital image are within the boundary and correspond to one another; and
      select the shared visual feature contained within the calculated boundary in both the first digital image and the second digital image of the stereo image pair for subsequent image editing operations.

16. The system of claim 15, further comprising program instructions executable by the at least one processor to:
   display the boundary of the region of the shared visual feature of the stereo image pair in connection with a display of the first digital image, wherein the input is received in the user interface displaying the first digital image;
   display the boundary of the region of the shared visual feature in connection with a display of the second digital image;
   receive subsequent input indicative of a region of the stereo image pair to which modification of the boundary is requested, and
   modify the boundary in response to the subsequent input.

17. The system of claim 15, wherein probabilities further comprise correspondence probabilities between the sets of pixels in the first digital image and the second digital image based on comparison of color values of respective pixels.

18. The system of claim 15, wherein probabilities comprise correspondence probabilities between the sets of pixels in the first digital image and the second digital image based on comparison of region labels of respective sets of pixels, wherein the region labels identify on a binary basis whether a pixel is within or outside the region of the stereo image pair corresponding to the shared visual feature indicated by the input.

19. The system of claim 15, wherein
   the system further comprises program instructions executable by the at least one processor to implement rectifying the first digital image and the second digital image; and
   the probabilities include a first probability distribution and the a second probability distribution that are restricted to probability of correspondence for points within a selected disparity along a particular scanline of the first digital image and the second digital image.

20. The system of claim 15, wherein probabilities further comprise correspondence probabilities between the sets of pixels in the first digital image and the second digital image based on comparison of depth values of respective pixels.

* * * * *